United States Patent
Takahashi

(10) Patent No.: US 9,104,702 B2
(45) Date of Patent: Aug. 11, 2015

(54) POSITIONING SYSTEM

(75) Inventor: Katsuhiko Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 50 days.

(21) Appl. No.: 13/877,944

(22) PCT Filed: Sep. 26, 2011

(86) PCT No.: PCT/JP2011/072702
§ 371 (c)(1),
(2), (4) Date: Apr. 5, 2013

(87) PCT Pub. No.: WO2012/046671
PCT Pub. Date: Apr. 12, 2012

(65) Prior Publication Data
US 2013/0188837 A1 Jul. 25, 2013

(30) Foreign Application Priority Data
Oct. 6, 2010 (JP) ................................ 2010-226844

(51) Int. Cl.
*G06K 9/00* (2006.01)
*G06F 17/30* (2006.01)
*G01C 21/20* (2006.01)
(Continued)

(52) U.S. Cl.
CPC .......... *G06F 17/30256* (2013.01); *G01C 21/20* (2013.01); *G01C 21/26* (2013.01); *G01S 5/16* (2013.01); *G06F 17/30241* (2013.01); *G06T 7/0044* (2013.01); *G06T 11/00* (2013.01); *G06T 2207/30252* (2013.01)

(58) Field of Classification Search
USPC ................... 235/411; 345/135, 700, E5.067; 348/169, 208.14, E13.023, E13.043, 348/E13.066; 382/103; 386/341; 701/25, 701/26, 56, 409, 421, 438, 446, 448, 455, 701/460, 461
See application file for complete search history.

(56) References Cited

U.S. PATENT DOCUMENTS 6,198,987 B1 * 3/2001 Park et al. .................... 701/1
2001/0043718 A1 * 11/2001 Laumeyer et al. ........... 382/104
(Continued)

FOREIGN PATENT DOCUMENTS

JP 2004-12429 A 1/2004
JP 2006-208223 A 8/2006
(Continued)

OTHER PUBLICATIONS

International Search Report of PCT Application No. PCT/JP2011/072702 mailed Jan. 17, 2012.
English Translation of Form PCT/ISA/237, Written Opinion of the International Search Authority, Mail Jan. 17, 2012.
(Continued)

*Primary Examiner* — Gregory F Cunningham
(74) *Attorney, Agent, or Firm* — Sughrue Mion, PLLC

(57) ABSTRACT

An object of the present invention is to provide a positioning system which makes it possible to perform positioning processing in a positioning target mobile object with a smaller calculation amount.

A scenery image database according to an aspect of the present invention is characterized by comprising a plurality of scenery image data and image acquisition locations at which the scenery image data have been acquired are correlated with each other and stored, wherein each of the plurality of scenery image data include a feature amount of a feature point corresponding to a thing other than a thing of which a location or a shape is unlikely to be kept as it is on the real world during a period larger than or equal to a predetermined period.

20 Claims, 24 Drawing Sheets

(51) Int. Cl.
*G01C 21/26* (2006.01)
*G01S 5/16* (2006.01)
*G06T 7/00* (2006.01)
*G06T 11/00* (2006.01)

(56) References Cited

U.S. PATENT DOCUMENTS

| | | | |
|---|---|---|---|
| 2008/0158361 A1* | 7/2008 | Itoh et al. | 348/155 |
| 2008/0177994 A1* | 7/2008 | Mayer | 713/2 |
| 2010/0026519 A1* | 2/2010 | Hsiao et al. | 340/905 |
| 2010/0080419 A1* | 4/2010 | Okugi et al. | 382/104 |
| 2010/0097226 A1* | 4/2010 | Parsons | 340/573.1 |
| 2012/0194681 A1* | 8/2012 | Atsmon et al. | 348/149 |

FOREIGN PATENT DOCUMENTS

| | | | | |
|---|---|---|---|---|
| JP | 2007108043 A * | 4/2007 | | G01C 21/00 |
| JP | 2007-133816 A | 5/2007 | | |
| JP | 3966419 B2 | 6/2007 | | |
| JP | 4206036 B2 | 10/2008 | | |
| JP | 2008-310446 A | 12/2008 | | |
| WO | WO-2010116715 A1 * | 10/2010 | | G11B 27/28 |

OTHER PUBLICATIONS

Kyutoku et al., "Detection of Forward Obstacles by Subtraction of Road-Surface between Present and Past In-Vehicle Camera Images", Technical Digest of the 15th Symposium on Sensing via Image Information, Society of Academic Study on Sensing via Image Information, Jun. 2009, IS2-15.

* cited by examiner

Fig.6

| SPOT | PROBABILITY | SPOT LOCATION | RELATIVE LOCATION (DIRECTION) |
|---|---|---|---|
| 501 | 10 | NORTH LATITUDE: 35.65 , EAST LONGITUDE: 139.7 | — |
| 502 | 95 | NORTH LATITUDE: 35.64 , EAST LONGITUDE: 139.7 | ANGLE −80 |
| 503 | 85 | NORTH LATITUDE: 35.63 , EAST LONGITUDE: 139.7 | ANGLE −45 |
| 504 | 40 | NORTH LATITUDE: 35.62 , EAST LONGITUDE: 139.7 | ANGLE −30 |

POSITIONING SYSTEM

This application is a National Stage Entry of PCT/JP2011/072702 filed Sep. 26, 2011, which claims priority from Japanese Patent Application 2010-226844 filed Oct. 6, 2010, the contents of all of which are incorporated herein by reference, in their entirety.

TECHNICAL FIELD

The present invention relates to a positioning system, a scenery image database, a database building apparatus, a database building method, a scenery image database building program and a positioning target apparatus which identify a current location of a mobile object on the basis of a scenery image which is photographed by an imaging means mounted on the mobile object.

BACKGROUND ART

A global positioning system (GPS) has been generally known as a technology for identifying the location of a mobile object. The GPS allows an in-vehicle receiver to receive radio waves transmitted from GPS satellites and perform positioning on the basis of clock-time differences from the transmissions of the radio waves until the receptions of the radio waves.

In positioning systems based on radio technologies, such as the GPS, there has been a problem that it is difficult to perform positioning at spots where at least predetermined number of radio waves cannot be received. As specific examples, valleys between buildings and undergrounds are given, and, in urban areas, a situation in which positioning is unavailable sometimes occurs.

As technologies each enabling prevention of the occurrence of such a problem, and having a principle completely different from that of the GPS, there have been disclosed technologies each for identifying a current location of a mobile object by collating scenery images acquired by a camera mounted on the mobile object with a database related to scenery images having been stored in advance.

In Patent document 1, there is a positioning method described below. That is, this positioning method is such that shape data representing the planar shapes of roads, and information related to the heights and colors of surrounding buildings are extracted from scenery images acquired by a camera mounted on a mobile object, and a current location of the mobile object is identified by collating the above data and information with an already built database.

In Patent document 2, there is disclosed a positioning method in which the locations of feature points regarding road indications are extracted from scenery images acquired by a camera mounted on a mobile object, and a current location of the mobile object is identified by collating the above with an already built database.

In Patent document 3, there is disclosed a positioning method in which, targeting a mobile object operating under the indoor environment, a ceiling is photographed with a camera mounted on a mobile object, and a current location and posture of the mobile object is identified by collating an image resulting from the photograph with an already built database.

Further, as a technology, not used for the purpose of positioning, in which, just like in the technology disclosed in patent literature 2, collating with a database is performed on the basis of feature points extracted from scenery images, such a method for detecting obstacles as described below are disclosed in non-patent literature 1. That is, in this method, scenery images acquired by a camera mounted on a mobile object are correlated with an already built database with respect to feature points which are called SIFT. Further, obstacles are detected by calculating differences between road-surface area images which have been determined to be correlated with each other. Here, the SIFT is an abbreviation of scale-invariant feature transform. In this method, as a mechanism for making it possible to properly correlate the scenery images and the already built database even when erroneously correlated feature points are mixed, a trial-and-error parameter estimation method, which is called a random sample consensus (RANSAC), is employed.

In Patent document 4, there is disclosed a variation area recognition apparatus described below which is based on a scenery image acquired by a camera mounted on a mobile object. In this apparatus, through correlation of the acquired scenery image with an already built database, an alignment thereof is performed, and areas each resulting in a discrepancy after the alignment are extracted as variation areas, that is, areas in which objects, which did not exist when the database was created, exist.

THE PRECEDING TECHNICAL LITERATURE

Patent Document

[Patent document 1] Japanese Patent Publication No. 4206036

[Patent document 2] Japanese Patent Application Laid-Open No. 2006-208223

[Patent document 3] Japanese Patent Application Laid-Open No. 2004-12429

[Patent document 4] Japanese Patent Publication No. 3966419

Non-Patent Document

[Non-patent document 1] Kyutoku, etc. "Detection of Forward Obstacles by Subtraction of Road-Surface between Present and Past In-vehicle Camera Images", Technical Digest of the 15th Symposium on Sensing via Image Information, Society of Academic Study on Sensing via Image Information, June, 2009, IS 2-15

SUMMARY OF INVENTION

Technical Problem

However, when attempting to perform positioning of a current location of a mobile object by using the related technologies, actually, there exist various problems.

First, the technology disclosed in Patent document 3 can be applied only under the indoor environment, and thus, it cannot be applied to mobile objects, such as a motorcar, which operate under the outdoor environment. The technology disclosed in Patent document 2 has also a problem that the related technology can function only under the environment road indications exist.

In the technology disclosed in Patent document 1, the collation is performed on the basis of predetermined feature amounts and the like related to the outer appearances of roads and buildings adjacent to the roads, and thus, this technology is deemed to be applicable not depending on places. However, in the present image recognition technology, it is difficult to cause a computer to automatically extract feature amounts used in the technology described in Patent document 1, such as the width of a road, the length of a road (the distance of a road from an intersection to a next intersection), and the number of buildings existing at both sides of a road. Accordingly, since it is necessary to build the database manually, there is a problem that the building cost of the database is high.

In contrast to these technologies, such a method as that in non-patent document 1, in which a current location of a mobile object is identified on the basis of location information regarding the feature points extracted from the scenery image, is advantageous in the respect that it can be applied to a broad environment not depending on whether it is an indoor one or an outdoor one. Moreover, this technology is effective in the respect that the building cost of the database is inexpensive because the extraction of feature points can be easily realized by employing one of existing methods.

In this regard, however, in such a collation method, there is a problem described below. That is, after estimation of correspondence relations between feature points extracted from a scenery image and feature points stored in a database, regarding a certain number or more of feature points which have been extracted at random, if a condition in which all estimated correspondence relations are proper is not satisfied, it is difficult to estimate a current location. Here, a proper correspondence relation means a state where a feature point on a scenery image and a feature point stored in a database, the feature points corresponding to the identical part of the identical object on the real world, are correlated with each other.

In processing for correlating feature points according to the present image recognition technology, it is difficult to perform correlating completely properly, and thus, in a method disclosed in non-patent document 1 and the like, a trial-and-error process, which is called RANSAC, is employed. Through the use of this RANSAC, an extraction of a certain number of pairs of feature points is repeatedly performed so that an event in which all feature points are properly correlated happens to be included.

Further, the larger the proportion of occurrence of erroneously correlated feature points becomes, the larger number of times the extraction of a certain number of pairs of feature points needs to be performed, thus, resulting in an increase of processing time necessary for the identification of the location. In the case where vehicles and/or persons whose locations are likely to move, and further, plants, such as roadside trees, whose shapes change along with the growths thereof, are photographed in an image used for building a scenery image database, there is a problem described below. With respect to feature points which are extracted from areas corresponding to such objects which are likely to move, the possibility that any proper correspondence relation does not exist when performing positioning of a positioning target mobile object is significantly high. However, to date, these feature points have been handled as collation target feature points, thus, resulting in an increase of processing time necessary for the location identification.

Object of the Invention

The present invention has been made in order to solve the aforementioned problem, and an object of the present invention is to provide a positioning system which makes it possible to perform positioning processing in a positioning target mobile object with a smaller calculation amount.

Solution to Problem

A scenery image database according to an aspect of the present invention is characterized by comprising a plurality of scenery image data and image acquisition locations at which the plurality of the scenery image data have been acquired are correlated with each other and stored, wherein each of the plurality of the scenery image data include a feature amount of a feature point corresponding to a thing other than a thing of which a location or a shape is unlikely to be kept as it is on the real world during a period larger than or equal to a predetermined period.

A database building method according to another aspect of the present invention is characterized by comprising; taking a scenery image, acquiring current location information, extracting feature amounts of corresponding feature points from the scenery image, and extracting an area which corresponds to an object of which a location or a shape is likely to vary in future in the real world from the scenery image.

A scenery image database building program according to a further aspect of the present invention, which can be executed on a computer characterized by comprising the steps of; a first imaging step of taking a scenery image, a location information acquisition step of acquiring current location information, a first feature point extraction step of extracting feature amounts of corresponding feature points from the scenery image acquired by the first imaging means, and a future variable area extraction step of extracting an area corresponding to an object of which a location or a shape is likely to vary in the real world from the scenery image data acquired by the first imaging means.

Advantageous Effects of Invention

As described above, according to some aspects of the present invention, it is possible to provide a positioning system which makes it possible to perform positioning processing in a positioning target mobile object with a smaller calculation amount.

BRIEF DESCRIPTION OF THE DRAWINGS

FIG. 6 is a diagram illustrating a probability for collation processing, location information related to a spot and relative location (direction) information obtained by collation processing, for each of four spots.

DESCRIPTION OF EXEMPLARY EMBODIMENT

Hereinafter, exemplary embodiments of the present invention will be described in detail with reference to the drawings.

First Exemplary Embodiment

A first exemplary embodiment of the present invention will be described in detail with reference to the drawings.

Figure 1:
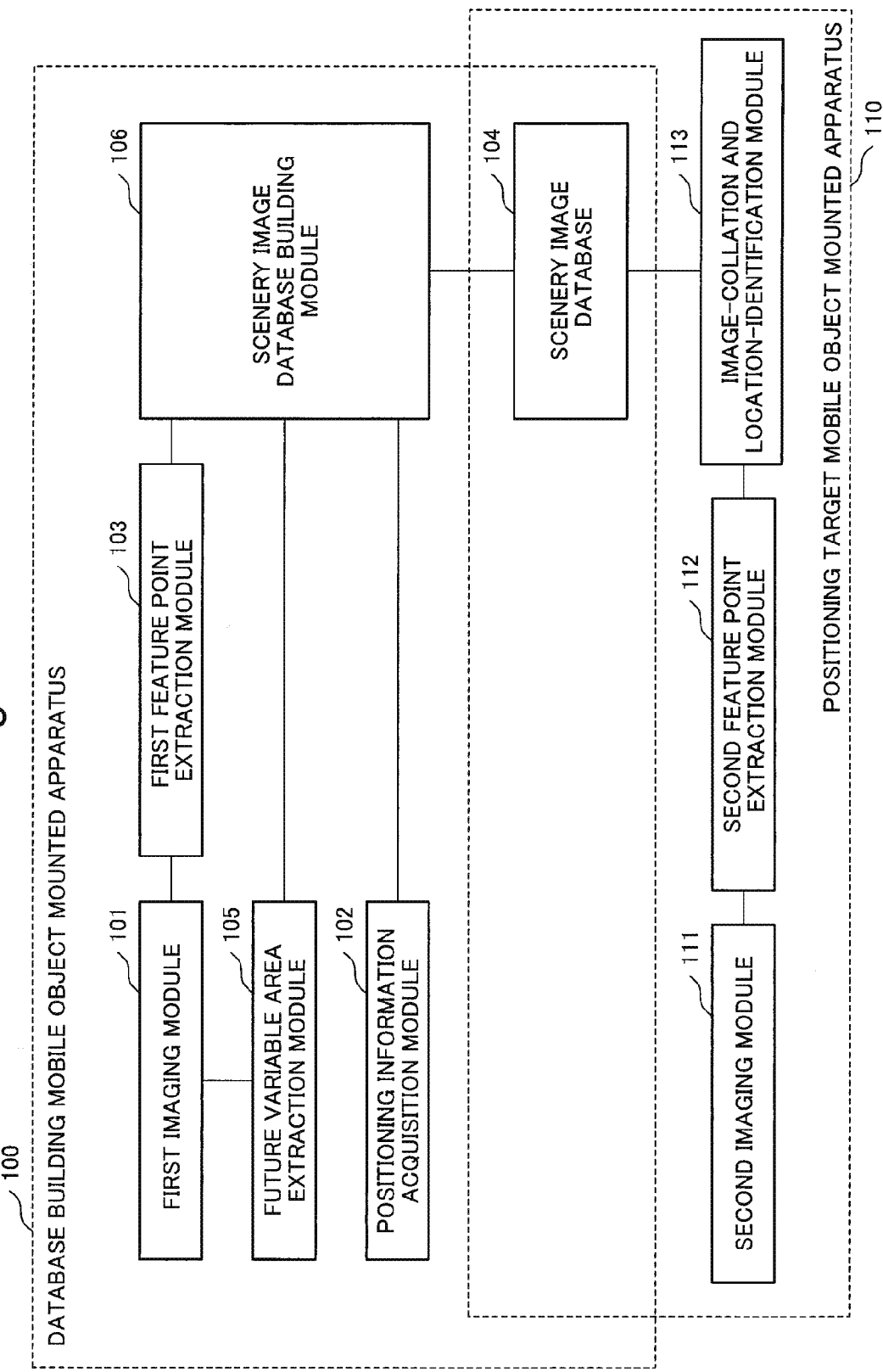
FIG. 1 is a diagram describing the present invention.

Referring to FIG. 1, the first exemplary embodiment of the present invention includes a database building mobile object mounted apparatus 100 and a positioning target mobile object mounted apparatus 110. The database building mobile object means, for example, a car, a robot or the like which is dedicated for building a database. The positioning target mobile object means, for example, a vehicle for a private use or a business use, a robot provided with an ambulation means, such as a wheel or foots, or the like.

The database building mobile object mounted apparatus 100 includes a first imaging module 101 for imaging scenery images, and a location information acquisition module 102 for acquiring a current location of the database building mobile object.

Moreover, the database building mobile object mounted apparatus 100 includes a first feature point extraction module 103 for extracting feature points and feature amounts thereof from each of the scenery images having been acquired by the first imaging module 101. Moreover, the database building mobile object mounted apparatus 100 includes a scenery image database 104 which stores the feature amounts of the extracted feature points and the location information corresponding so that the feature amounts of the extracted feature points and the location information are correlated with each other. A well-known example of the feature point extracted by the first feature point extraction module 103 and the feature amount thereof is a scale-invariant feature transform (SIFT) feature, a speeded up robust feature (SURF) or the like.

Moreover, the database building mobile object mounted apparatus 100 includes a future variable area extraction module 105 which extracts areas, for which corresponding locations and/or shapes are highly likely to vary in near future, from each of scenery images having been photographed by the imaging module. The area for which a corresponding location and/or a shape are/is highly likely to vary in near future means an area in which there are recorded not only currently moving persons, vehicles and the like, but also persons, vehicles and the like which are currently in a stationary state, but this state is a temporal one, and they are likely to move after a certain period of time.

Further, the database building mobile object mounted apparatus 100 includes a scenery image database building module 106 having the following function. That is, the scenery image database building module 106 stores feature amounts of feature points which have been extracted from each of areas other than the areas which have been extracted by the future variable area extraction module 105, into the scenery image database, so as to correlate the feature amounts with information related to the current location.

The positioning target mobile object mounted apparatus 110 includes a second imaging module 111 for imaging scenery images, and a second feature point extraction module 112 for extracting feature points and feature amounts thereof from each of the scenery images having been acquired by the second imaging module. Further, the positioning target mobile object mounted apparatus 110 includes an image-collation and location-identification module 113, and a scenery image database 114. The image-collation and location-identification module 113 collates the feature points which have been extracted by the second feature point extraction module 112 and feature point information stored in the scenery image database 104, and thereby identifies a current location of the above-described positioning target mobile object mounted apparatus 110.

First, the configuration of the database building mobile object mounted apparatus 100 will be described in detail.

The first imaging module 101 includes an in-vehicle camera and the like, and images scenery images. For example, while a database building mobile object moves along a predetermined course on a road, the first imaging module 101 momentarily photographs scenery images in front of a vehicle therefor.

The location information acquisition module 102 includes a real-time kinetic GPS (RTK-GPS) mounted in the database building mobile object and a high-accuracy positioning module using speed pulse information and the like. The location information acquisition module 102 acquires location information corresponding to respective spots where the first imaging module 101, that is, the database building mobile object, photographed images. A piece of the location information is expressed by, for example, two kinds of numerical values of longitude and latitude.

The first feature point extraction module 103 extracts feature points from each of scenery images having been acquired by the first imaging module 101, and extracts coordinate locations of the feature points on the image and feature amount of the feature points as feature point information. As a type of feature points extracted by the first feature point extraction module 103 and feature amounts thereof, for example, a type of scale-invariant feature transform (SIFT) features, a type of speeded up robust features (SURF), these types being well known, or the like, can be employed.

The scenery image databases 104 is a database in which sets of feature point information extracted from corresponding scenery images and photograph locations of the corresponding scenery images are stored such that the sets of feature point information and the photograph locations are correlated with each other.

Figure 2:
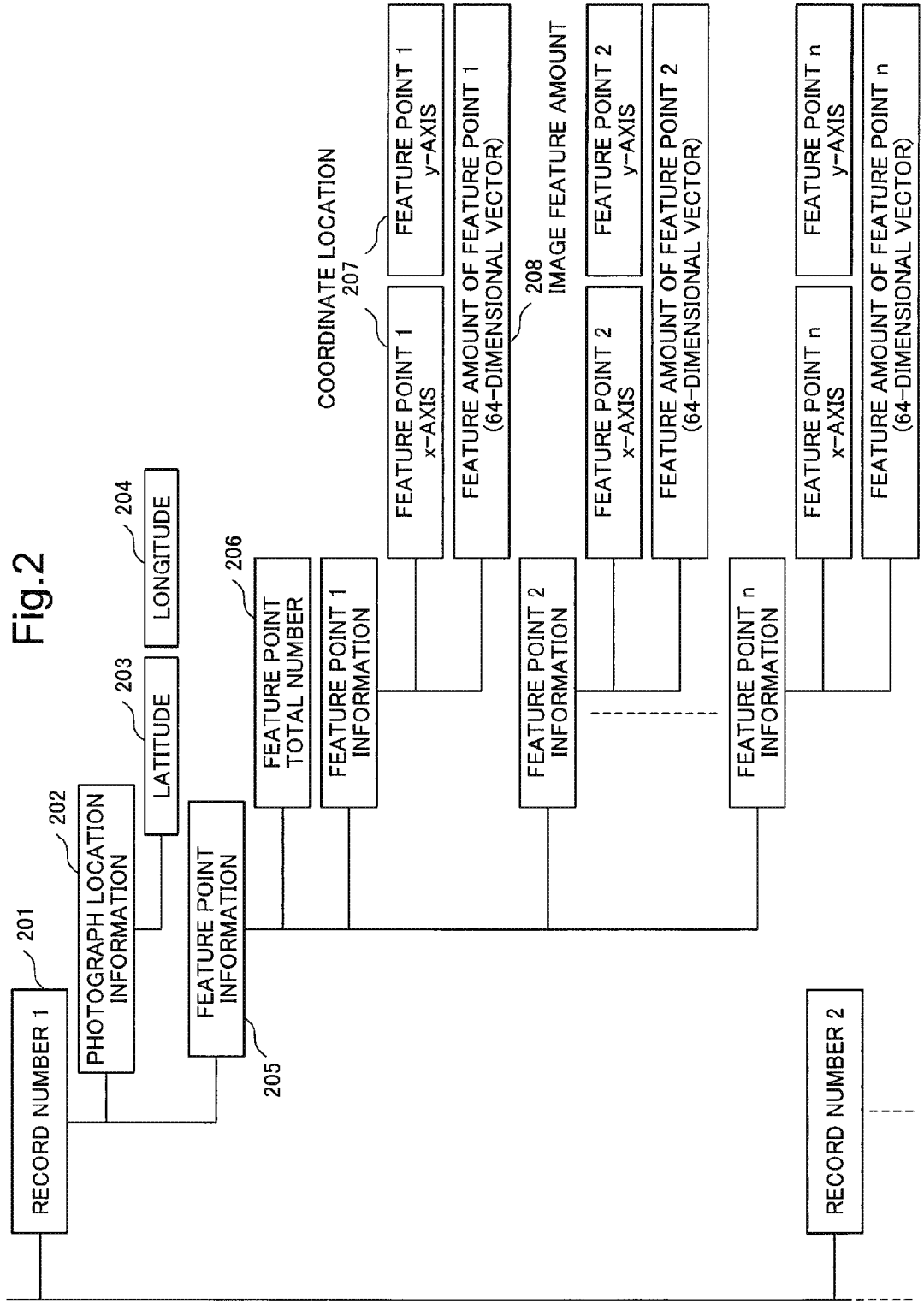
FIG. 2 is a diagram illustrating an example of description in a scenery image database.

An example of description of the database is illustrated in FIG. 2. A record corresponding to a record number 201 includes, as a block of information corresponding to a scenery image photographed at a certain clock time, information related to latitude 203 and longitude 204 as a piece of photograph location information 202, and a set of feature point information 205. The set of feature point information 205 includes a feature-point total number 206 indicating a total number of feature points having been extracted at this time, and, for each of the feature points, the set of feature point information 205 also includes an aggregate of groups of a coordinate location 207 of the feature point on the relevant scenery image and an image feature amount 208 around the feature point.

The image feature amount 208 can be realized by using, for example, the type of SURF features or the like, and is expressed by 64 dimensions of vector values resulting from digitizing the variation direction and the variation magnitude of a pixel value within a local area. Further, records, the number of which is equal to that of the scenery images having been processed, are created. In addition, in this exemplary embodiment, the scenery image database 104 is initially built inside the database building mobile object mounted apparatus 100, and afterwards, duplicate of the scenery image database is installed inside the positioning target mobile object mounted apparatus 110 described below.

The future variable area extraction module 105 extracts areas existing on each of images having been acquired by the first imaging module 101, the areas corresponding to respective objects which are included in the acquired image, and for which corresponding locations and/or shapes are highly likely to vary in future in the real world. As objects for which corresponding locations and/or shapes are highly likely to vary in future under the outdoor environment, a vehicle and a pedestrian can be given.

The future variable area extraction module 105 extracts areas each corresponding to a vehicle or a pedestrian by means of an image recognition method or the like. Specifically, it is possible to detect such areas by means of existing detection methods, such as a person detection method and a vehicle detection method, or an existing general object detection method.

Incidentally, the areas extracted by the future variable area extraction module 105 are not areas each corresponding to an object which was performing any movement at a clock time when the first imaging module 101 acquired the image, but areas each corresponding to an object, such as a person or a vehicle, which is highly likely to move. In other words, the future variable area extraction module 105 also extracts areas each corresponding to a person or a vehicle which was in a stationary state at a clock time when the first imaging module 101 acquired image.

Figure 3:
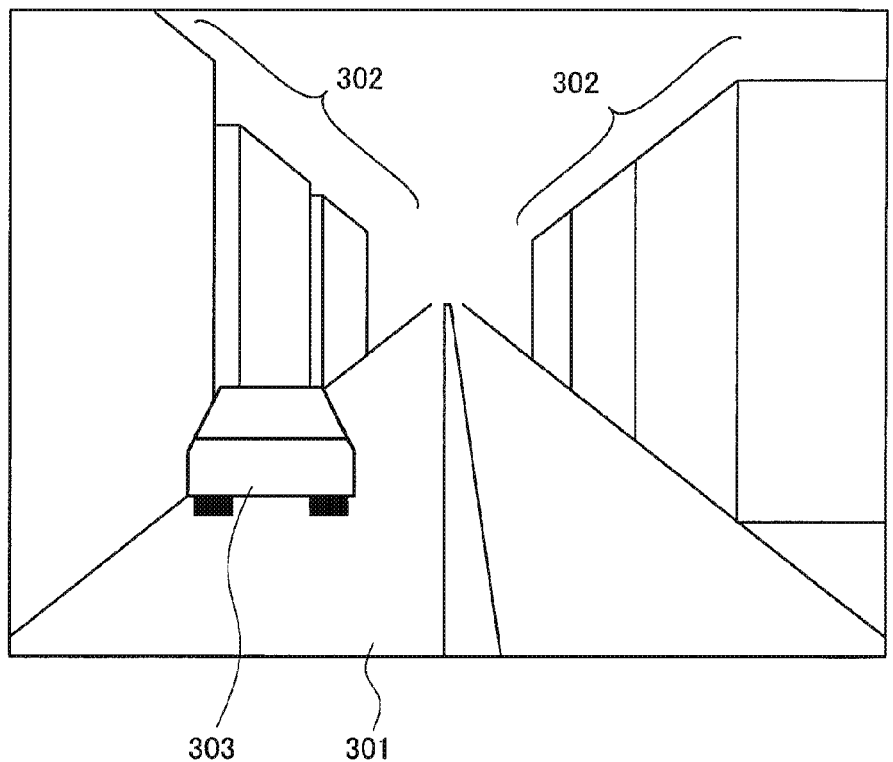
FIG. 3 is a diagram illustrating an example of an image in front of an mobile object, which is acquired by a first imaging module 101.

An example of areas extracted by the future variable area extraction module 105 will be described below by using FIG. 3. FIG. 3 is a diagram illustrating an example of an image in front of a mobile object, which was acquired by the first imaging module 101, and in this image, a roadway surface area 301, a building area 302 and a parking vehicle area 303 are included. In this case, the future variable area extraction module 105 extracts the parking vehicle area 303 including a parking vehicle which is likely to move in future.

Figure 4:
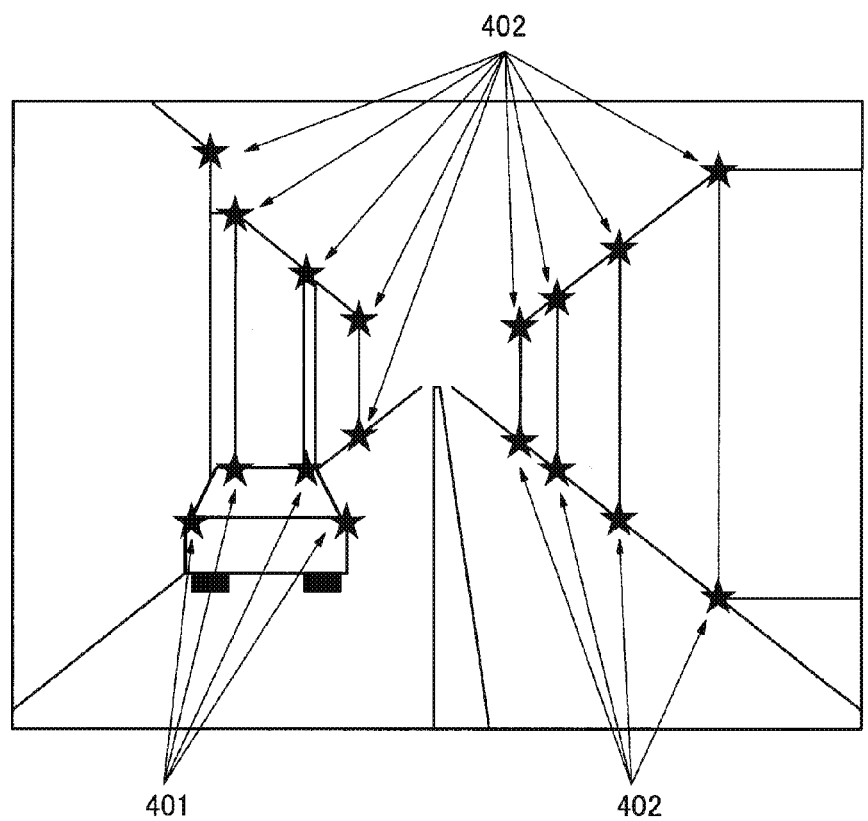
FIG. 4 is a diagram illustrating an image acquired by a first imaging module 101, and the locations of feature points extracted therefrom.

The scenery image database building module 106 processes feature point information related to feature points, which have been extracted by the first feature point extraction module 103, except feature points having been extracted from areas corresponding to vehicles or pedestrians, which have been extracted by the future variable area extraction module 105, as follows. That is, the scenery image database building module 106 correlates this feature point information with location information which is related to the database building mobile object, and which has been acquired by the location information acquisition module 102, and then, records the resultant feature point information into the scenery image database 104. The state of the selection of feature points made by the scenery image database building module 106 will be described by using FIG. 4. FIG. 4 is a diagram illustrating an image having been acquired by the first imaging module 101 and the locations of feature points extracted from the image. Asterisks in the diagram indicate the locations of the feature points. Information related to feature points 402 remaining after the removal of feature points 401 which corresponds to the parking vehicle area 303, and which having been extracted by the future variable area extraction module 105, is recorded into the scenery image database 104.

Next, the configuration of the positioning target mobile object mounted apparatus 110 will be described.

The second imaging module 111 is mounted in a positioning target mobile object, and images scenery images momentarily.

The second feature point extraction module 112 extracts feature points from each of scenery images having been acquired by the second imaging module 111, and extracts coordinate location information and image feature amounts on the scenery image. As an extraction algorithm for the feature points, an extraction algorithm the same as that for the first feature point extraction module 102 should be employed.

The image-collation and location-identification module 113 collates the feature point information having been extracted by the second feature point extraction module 112 and the feature point information stored in the scenery image database 104, and thereby identifies a current location of the positioning target mobile.

Hereinafter, a concrete collation method for feature points and a location identification method for a positioning target mobile will be described in detail.

First, a pair of feature points having feature amounts similar to each other are extracted from an aggregate of feature points having been extracted by the second feature point extraction module 112, and a certain record of the records stored in the scenery image database 104, that is, an aggregate of feature points which has been stored so as to be correlated with one spot. The feature amount of a feature point is expressed by a vector value. Specifically, here, for example, with respect to a feature amount of one feature point of the aggregate of feature points having been extracted by the second feature point extraction module 112, and a feature amount of one feature point of a record of the records stored in the scenery image database 104, the magnitude of a norm of the difference between two vectors corresponding to the above feature amounts is calculated. Further, feature points corresponding to the magnitude thereof smaller than or equal to a threshold value are determined as feature points having feature amounts similar to each other, and these feature points should be extracted as a pair thereof.

After all pairs of feature points having feature amounts similar to each other have been extracted, eight pairs are extracted from among them at random. Subsequently, an estimation value of a relative location relation for a mobile object, relative to a location of a mobile object correlated with a record of those stored in the scenery image database 104 is obtained by using an algorithm which is called an eight-point method. Moreover, it is possible to calculate a probability with respect to the estimated relative location by using information related to all pairs of feature points each having a feature amount similar to the estimation value.

In this regard, however, in order to obtain the relative location relation with accuracy, feature points included in each of eight pairs need to be properly correlated with each other. However, since the pairs of feature points may include pairs of feature points improperly correlated, a relative location and the relative locations' probability are calculated lots of times along with changing the selection of the eight pairs, and thereby a relative location giving a maximum probability is obtained and selected.

Further, the above process is a collation process on just one record selected from among those of the scenery image database 104, and thus, through collation processes on feature points included in aggregates corresponding to other records, about one to three results regarding records each having an estimation value of a high probability are selected. Subsequently, a current relative location relative to photograph locations included in the respective selected records, the photograph location being a location at which data included in a corresponding record is photographed, are calculated in accordance with the principle of triangulation, and thereby a current location of the mobile object is identified on the basis of the calculated current relative location, taking into consideration absolute location information stored in the scenery image database 104, which is related to a location at which data is photographed.

Figure 5:
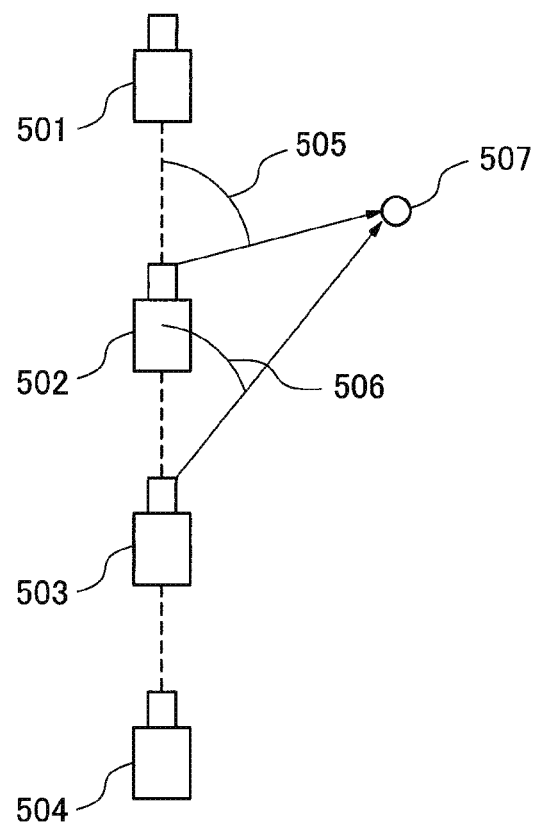
FIG. 5 is a diagram illustrating location relations between four spots resulting from collection of data recorded in a scenery image database 104 and a current location of a positioning target mobile object mounted apparatus 1.

A specific example will be described with reference to FIGS. 5 and 6. FIG. 5 is a schematic diagram illustrating four spots (a spot 501, a spot 502, a spot 503 and a spot 504), at which corresponding data recorded in the scenery image database 104 and collected, and a current location 507 of a positioning target mobile object. FIG. 6 is a diagram illustrating, for the respective spots 501 to 504, probability for collation processes on data related to feature points with a piece of data related to a feature point extracted at a current clock time, location information, and direction values representing relative location relations having been obtained in the respective collation processes.

Fundamental relative location information obtained by using the eight-point method includes three-dimensional relative direction information or absolute distance information regarding a mobile object, and two kinds of three-dimensional rotation information related to an optic axis of an imaging module with respect to a current location of the positioning target mobile object, and a location where the scenery image database 104 was created. In FIG. 6, however, only relative azimuth information on a horizontal surface is simply selected and illustrated from among the above some kinds of information.

In the case of FIGS. 5 and 6, for example, it is possible to make a determination on the basis of two pieces relative location information having been extracted at the respective spots 502 and 503 at which relatively high probability are extracted. In FIGS. 5 and 6, there are illustrated an angle 505 which was estimated by the image-collation and location-identification module 113, and which is relative to an optic axis regarding the current location relative to the spot 502, as well as an angle 506 which was estimated by the image-collation and location-identification module 113, and which is relative to an optic axis regarding the current location relative to the spot 503. That is, it can be geometrically determined that a point (a point denoted by 507 in FIG. 5), which is located on a line obtained by rotating a line connecting the points 502 and 501 in a rightward direction by an angle of 80 degrees around the spot 502, and which is located on a line obtained by rotating a line connecting the points 502 and 503 in a rightward direction by an angle of 45 degrees around the spot 503, is a current location of the positioning target mobile object.

Figure 7:
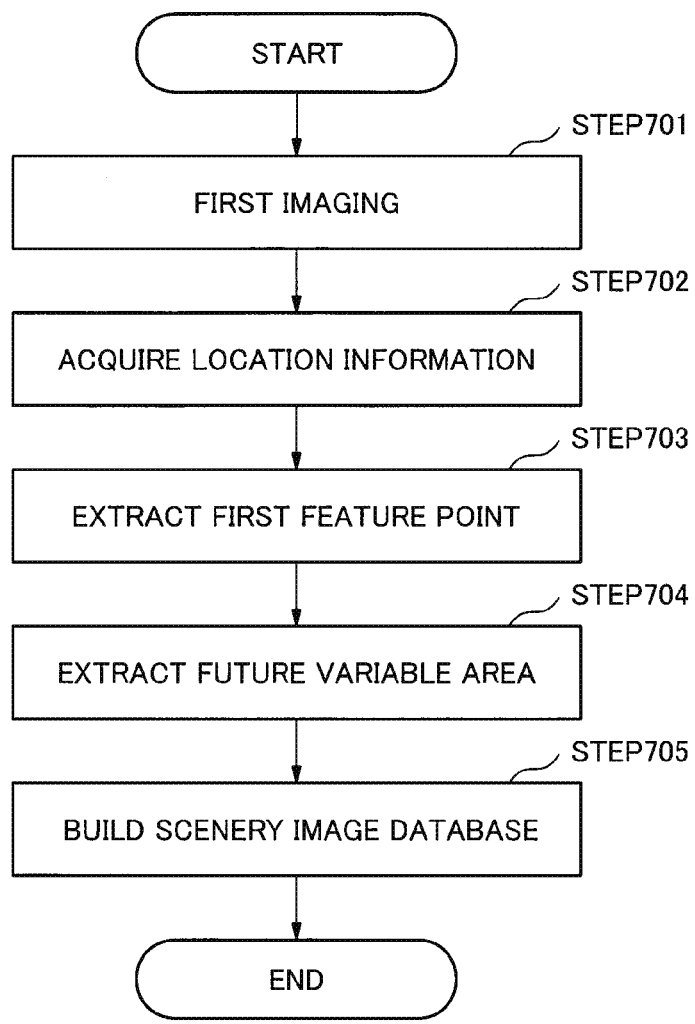
FIG. 7 is a flowchart for a database building mobile object mounted apparatus.
Figure 8:
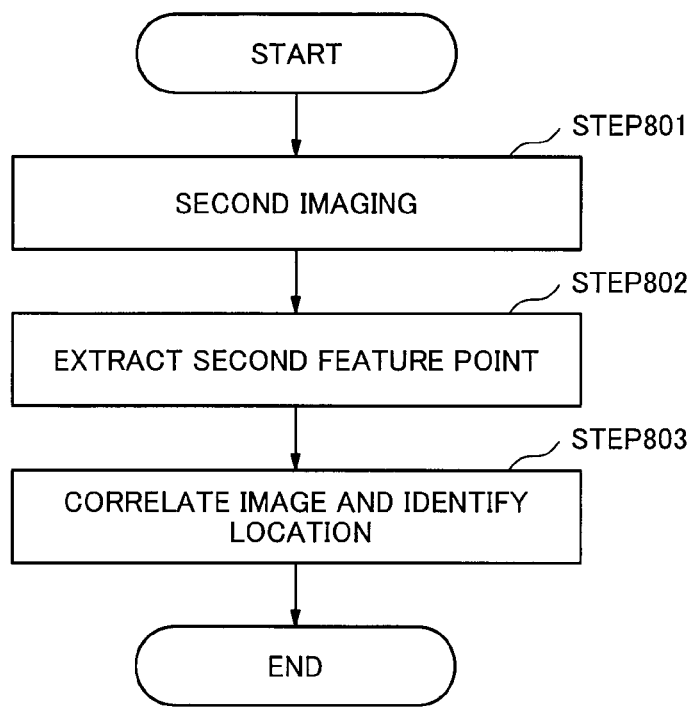
FIG. 8 is a flowchart for a positioning target mobile object mounted apparatus.

Next, operation of this first exemplary embodiment will be described in detail with reference to the drawings. FIGS. 7 and 8 are flowcharts illustrating operation of the database building mobile object mounted apparatus 100 and operation of the positioning target mobile mounted apparatus 110 according to this exemplary embodiment, respectively.

First, operation of the database building mobile object mounted apparatus 100 will be described with reference to FIG. 7.

First, the first imaging module 101 images an image in front of a mobile object (Step S701). Further, the location information acquisition module 102 acquires an accurate location information related to a mobile object in which the database building mobile object mounted apparatus 100 is mounted (Step S702). Next, the first feature point extraction module 103 extracts feature points from the image having been imaged by the first imaging module 101 (Step S703). Moreover, the future variable area extraction module 105 extracts areas each corresponding to a vehicle or a person from the image having been imaged by the first imaging module imaged (Step S704).

Further, the scenery image database building module 106 extracts only feature points, which do not belong to the areas each corresponding to a vehicle or a person, and having been extracted by the future variable area extraction module 105, among the feature points having been extracted by the first feature point extraction module 103. Subsequently, the scenery image database building module 106 stores respective information related to feature-point locations and feature amounts regarding the feature points, and the piece of location information having been obtained by the location information acquisition module 102 into the scenery image database 104 such that the information regarding the feature points and the piece of location information are correlated (Step S705).

Every time the first imaging module 101 acquires a new image, the processes in Steps S701 to S705 are repeatedly performed. In addition, it is most desirable that the process in Step S702 is performed in synchronization with that in Step S701.

Next, operation of the positioning target mobile object mounted apparatus 110 will be described with reference to a flowchart shown in FIG. 8.

The second imaging module 111 photographs an image in front of the positioning target mobile object mounted apparatus 110 (Step S801). The second feature point extraction module 112 extracts feature points from the image having been photographed by the second imaging module 111 (Step S802).

The image-collation and location-identification module 113 collates the feature points having been extracted by the second feature point extraction module 112 and the feature point information stored in the scenery image database 104, and thereby identifies and outputs a current location of the positioning target mobile (Step S803).

Figure 18:
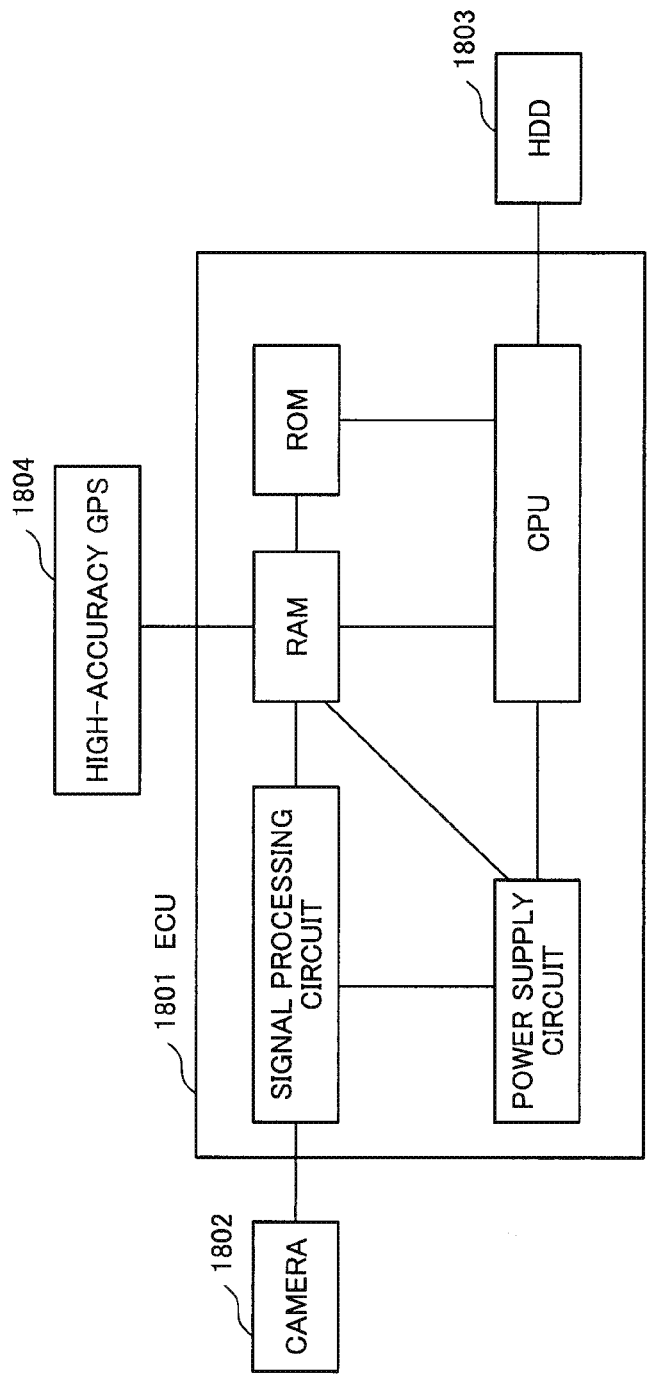
FIG. 18 is a diagram illustrating a hardware configuration of a database building mobile object mounted apparatus in a first exemplary embodiment of the present invention.

The above-mentioned database building mobile object mounted apparatus 100 includes an electronic control unit (ECU) 1801, an in-vehicle camera 1802, a hard disk 1803 and a high-accuracy GPS 1804, such as shown in FIG. 18. It can be said that the above-described database building mobile object mounted apparatus 100 is configured such that the above-described modules are mounted and actuated on an apparatus configured in such a manner as described above. The ECU 1801 is a unit for controlling the entire apparatus, and includes a central processing unit (CPU), random access memory (RAM), read only memory (ROM), a signal processing circuit, a power supply circuit and the like. That is, the above-described exemplary embodiment is realized by reading computer programs, which can realize the functions and the determination logics having been referred to in the description therefor, into the ECU 1801 and executing the programs, except for the functions of the imaging module and the location information acquisition module. Further, it is also possible to realize the functions of the ECU 1801 by hardware and integrate them into a microcomputer. Moreover, a part of the functions may be realized by hardware components, and the same functions may be realized by cooperated operation of the hardware components and software programs. Further, the hard disk 1803 is an apparatus for storing a scenery image database, and may be constituted by a storage medium other than a hard disk, such as flash memory.

Figure 19:
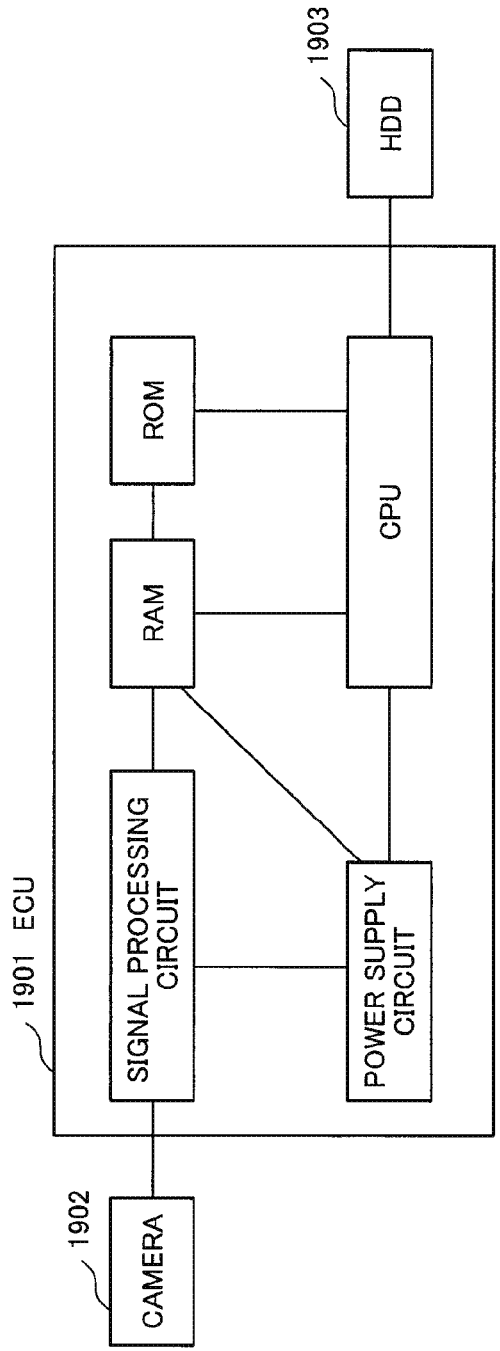
FIG. 19 is a diagram illustrating a hardware configuration of a positioning target mobile object mounted apparatus in a first exemplary embodiment of the present invention.

The above-described positioning target mobile object mounted apparatus 110 is constituted by an electronic control unit (ECU) 1901, an in-vehicle camera 1902 and a hard disk 1903 such as shown in FIG. 19, and it can be said that the positioning target mobile object mounted apparatus 110 is configured such that the above-described modules are mounted and actuated on an apparatus configured in this manner. The ECU 1901 is a unit for controlling the entire apparatus, and includes a central processing unit (CPU), random access memory (RAM), read only memory (ROM), a signal processing circuit, a power supply circuit and the like. That is, the above-described exemplary embodiment is realized by reading computer programs, which can realize the functions and the determination logics having been referred to in the description therefor, into the ECU 1901 and executing the programs, except for the function of the second imaging module. Further, it is also possible to realize the functions performed by the ECU 1801 by hardware and integrate them into a microcomputer. Moreover, a part of the functions may be realized by hardware components, and the same functions may be realized by cooperated operation of the hardware components and software programs. A scenery image database having been built in the database building mobile object should be stored in the hard disk 1903 in the form of a replica. Further, as a different configuration example, the scenery image database may be stored in the ROM inside the ECU 1901 without any use of a hard disk.

According to this exemplary embodiment, feature points extracted by the first feature point extraction module 103 except particular feature points build the scenery image database 104. The particular feature points are feature points belonging to vehicles and pedestrians which, along with future location changes, cause the lowering of efficiency of the image collation in the image-collation and location-identification module included in the positioning target mobile object mounted apparatus 110. Accordingly, in the image-collation and location-identification module 113, it is possible to correctly collate images by performing a smaller number of trials employing the RANSAC.

In the above-mentioned exemplary embodiment, the description has been made supposing that images acquired by the first imaging module are images, such as color images or black-and-white images, which result from capturing light of a wavelength band included in a visible-light region. However, the first imaging module may be constituted by an apparatus, such as a multi-spectrum camera, which is capable of acquiring images resulting from capturing light of a wavelength band not included in the visible-light region.

In this case, the future variable area extraction module 105 may further extract plants and the like. Since a large number of feature points are extracted from an area corresponding to leaves of roadside trees and the shapes regarding the roadside trees change because of wind and their growths, so that the locations of the large number feature points move, the feature points become noise factors in the collation process on images.

It is not necessarily easy to accurately determine areas corresponding to plants, such as roadside trees, only from information included in a visible light wavelength region. However, it is known that chlorophyll reflects light of a wavelength band of a near-infrared region to a great degree, and thus, the use of multispectral image capturing information of a wavelength band of a near-infrared region makes it possible to relatively easily extract the areas corresponding to plants.

Specifically, for example, areas, at each of which a reflection intensity value for light of a wavelength band of a near-infrared region is larger than or equal to a constant threshold value, should be extracted. Although the fiber of clothes sometimes also indicates a high reflection intensity for light of a wavelength band of a near-infrared region, pedestrians are also included in detection targets, and further, the future variable area extraction module 105 does not need to distinguish plant areas and pedestrian areas, so that there is no problem from a functionality aspect.

According to this first exemplary embodiment of the present invention, the future variable area extraction module 105 extracts areas corresponding to vehicles and persons whose locations are highly likely to move in future, from the images having been used for building the scenery image database. Moreover, the future variable area extraction module 105 extracts areas corresponding to plants, such as roadside trees, the shapes of which change as they grow.

Subsequently, the scenery image database 104 is built by using only information related to feature points having been extracted from outside of these areas, and thus, the probability of selecting pairs of properly correlated feature points in the RANSAC process increases, so that the number of repetition of the RANSAC process can be reduced. In addition, the "RANSAC" is an abbreviation of "random sample consensus".

As a result, in a positioning system which identifies a current location of a positioning target mobile object by collating feature-point locations with those recorded in a database, it is possible to perform positioning with a smaller amount of calculation.

An advantageous effect brought about by the reduction of the amount of calculation will be described in detail. It is supposed that all of feature points extracted by the first feature point extraction module 103 have been stored in the scenery image databases 104, and one hundred points out of the feature points have been correlated with feature points included in the scenery image database 104. Further, it is supposed that 60% thereof are properly correlated.

Further, supposing that, in the case where the eight pairs having been extracted at random from among the one hundred pairs of feature points are properly correlated, the current location can be correctly identified, the probability of occurrence of an event in which the positioning can be correctly achieved as the result of performing the trial employing the RANSAC once results in approximately $(0.6)^8=1.7\%$. Therefore, an expected value can be considered such that, if the trial is performed sixty times, the positioning can be correctly achieved once.

In contrast, in the case where the scenery image database is built by using feature points except feature points corresponding to persons, vehicles, roadside trees and the like, the probability of occurrence of an event in which a pair of properly correlated feature points increases, so that, assuming that the probability above is set to 0.8, the probability of occurrence of an event in which the positioning can be correctly achieved as the result of performing the trial once results in approximately $(0.8)^8=17\%$. Therefore, an expected value can be considered such that, if the trial is performed six times, the positioning can be correctly achieved once. That is, in this example, it is possible to reduce the amount of calculation necessary for performing positioning in the positioning target mobile object to 1/10.

Further, the advantageous effect of reducing the amount of calculation actually leads to an advantageous effect of reducing cost with respect to the positioning target mobile object mounted apparatus. This is because the reduction of the amount of calculation enables configuration of the positioning target mobile object mounted apparatus by using lower price embedded processors.

Further, the reasons why, in this first exemplary embodiment, the future variable area extraction module 105, which extracts areas corresponding to vehicles, persons and plants, is particularly applied to the database building mobile object mounted apparatus 100 are as follows. That is, it is assumed that the database building mobile object mounted apparatus 100 is installed in a mobile object which can be equipped with expensive and high-performance apparatuses and which is a special mobile whose production volume is small, and thus, the increase of the amount of process calculation and a price increase because of the addition of the future variable area extraction module 105 are easy to be allowed. Further, in the configuration in which a server apparatus described below builds a scenery image database, since there is no restriction regarding a real-time property on processes executed at the time when the scenery image database is built, there is no problem in the increase of the amount of calculation on processes because of the addition of the future variable area extraction module 105.

Second Exemplary Embodiment

Figure 9:
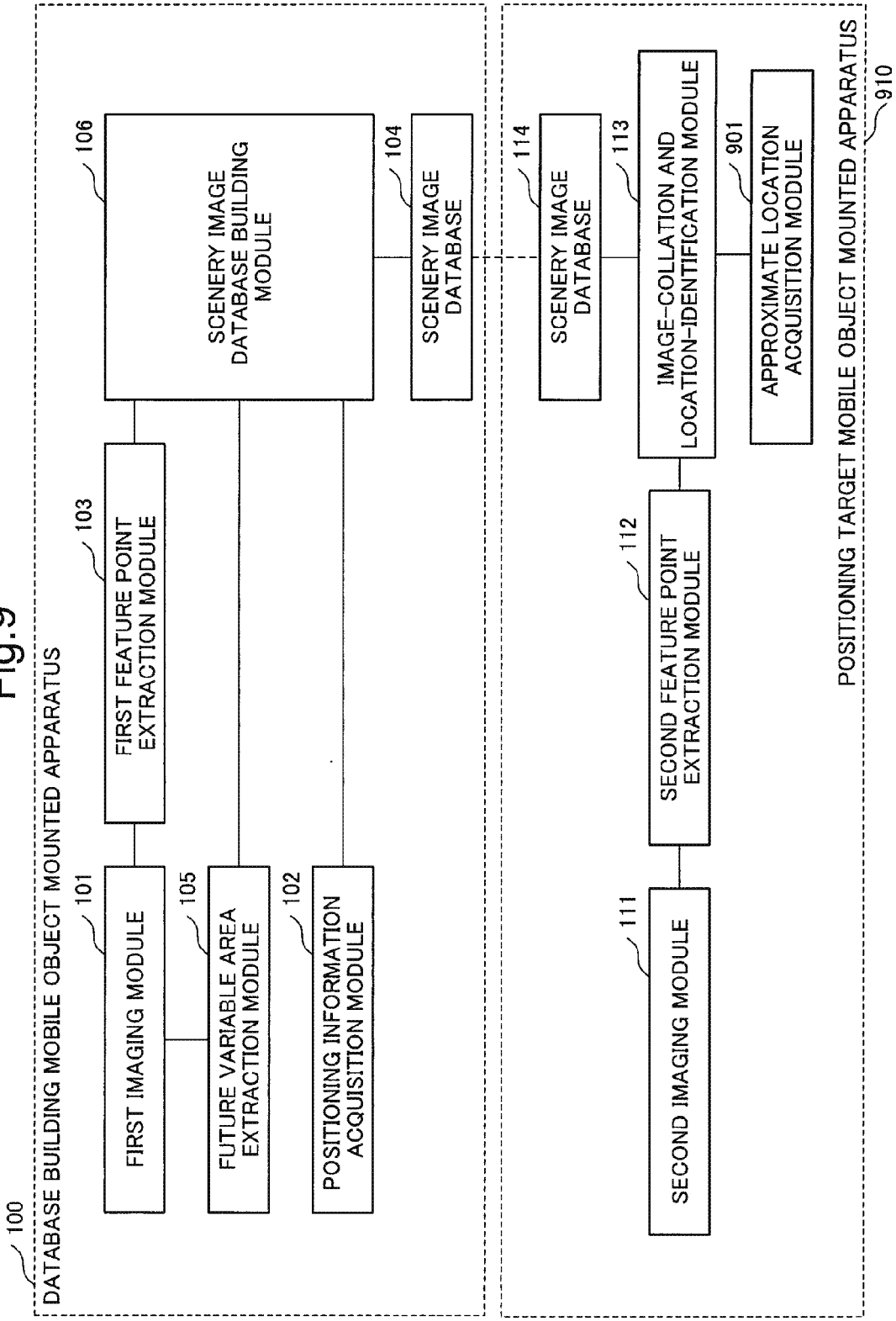
FIG. 9 is a diagram describing a second exemplary embodiment of the present invention.

A second exemplary embodiment of the present invention will be described by using FIG. 9. Referring to FIG. 9, in this second exemplary embodiment, a positioning target mobile object mounted apparatus 910 is equipped with an approximate location acquisition module 901, in addition to the components of the first exemplary embodiment shown in FIG. 1. Functions except for those of the approximate location acquisition module 901 and the image-collation and location-identification module 113 are the same as those of the first exemplary embodiment shown in FIG. 1.

The approximate location acquisition module 901 includes an inexpensive GPS or map-matching assembly, and acquires a current approximate location of a positioning target mobile object.

The image-collation and location-identification module 113 collates feature point information having been extracted by the second feature point extraction module 112 with the scenery image database 104, and thereby determines a current location of a mobile object with a higher degree of accuracy than that of an approximate location. In this regard, however, in this exemplary embodiment, only records which are stored in the scenery image database 104 so as to be correlated with locations around the approximate location having been acquired by the approximate location acquisition module 901 are used in the collation. As a result, it is possible to limit data targeted for collation, so that it is possible to reduce the amount of calculation necessary for collation.

Figure 10:
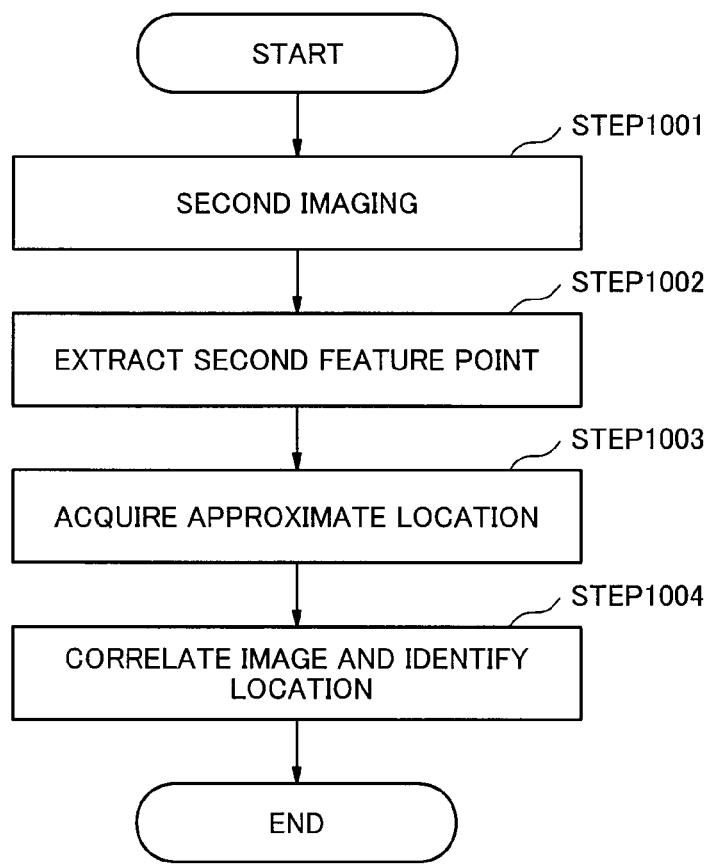
FIG. 10 is a flowchart for a positioning target mobile object mounted apparatus in a second exemplary embodiment of the present invention.

Next, operation of this second exemplary embodiment will be described in detail with reference to the drawings. Since the operation of database building mobile object mounted apparatus 100 is the same as shown in FIG. 3, operation of the positioning target mobile object mounted apparatus 110 will be described in detail with reference to a flowchart shown in FIG. 10.

First, the second imaging module 111 photographs an image in front of a positioning target mobile object (Step S1001). The second feature point extraction module 112 extracts feature points from the image having been acquired in Step S1001 (Step S1002). The approximate location acquisition module 1001 acquires a current approximate location of a vehicle targeted for positioning (Step S1003). The image-collation and location-identification module 113 performs collation with respect to the feature points having been extracted in the above Step S1002 by using only feature point information which is recorded in the scenery image database, and which has been narrowed down by using the approximate location information having been acquired in Step S1003, and thereby identifies and outputs an accurate current location of the mobile object.

According to this second exemplary embodiment, it is possible to narrow down feature point information recorded in the scenery image database, which is used for collation performed by the image-collation and location-identification module, and this second exemplary embodiment has an advantageous effect that the amount of calculation necessary for the collation can be reduced.

Third Exemplary Embodiment

Figure 11:
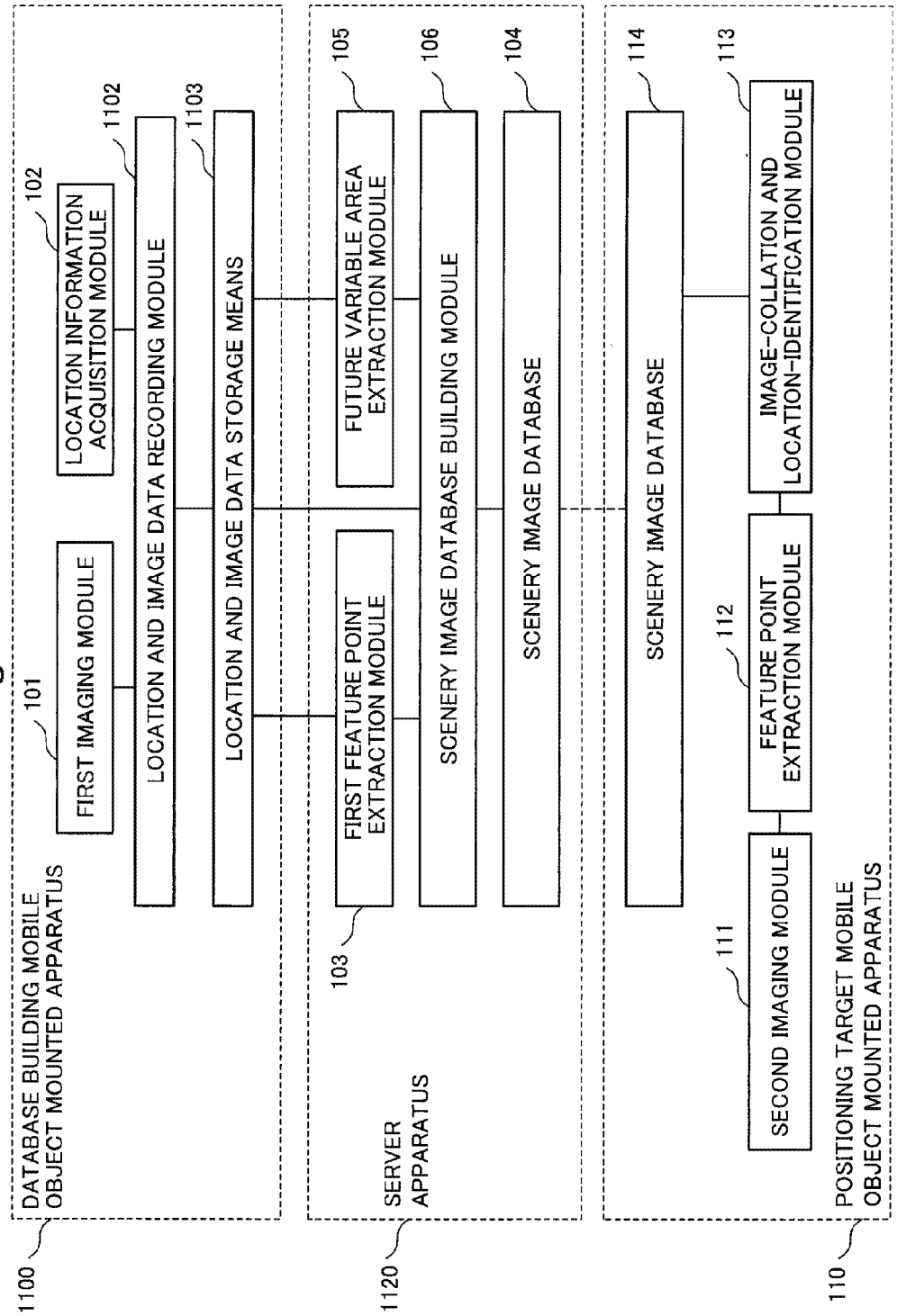
FIG. 11 is a diagram describing a third exemplary embodiment of the present invention.

A third exemplary embodiment of the present invention will be described by using FIG. 11. Referring to FIG. 11, this third exemplary embodiment is different in the following respects. That is, as compared with the first exemplary embodiment shown in FIG. 1, this third exemplary embodiment is different from the above in the respect that the modules of the database building mobile object mounted apparatus 100 are separated into two sets, which are installed into respective new apparatuses of a database building mobile object mounted apparatus 1100 and a server 1120. Moreover, this third exemplary embodiment is different in the respect that, as a mechanism for exchanges of scenery images and location information between the database building mobile object mounted apparatus 1100 and the server 1120, a location and image data recording module 1102 and a location and image data storage means 1103 are added.

First, the database building mobile object mounted apparatus 110 in this third exemplary embodiment will be described.

The first imaging module 101 and the location information acquisition module 102 are the same as those of the exemplary embodiment shown in FIG. 1.

The location and image data storage means 1103 is data for correlating and storing image information and location information which are acquired by the first imaging module 101 and the location information acquisition module 102 at the same clock time, respectively.

The location and image data recording module 1102 is a module for recording therein the image information and the location information, which have been acquired by the first imaging module 101 and the location information acquisition module 102 at the same clock time, respectively, into the location and image data storage means 1103 such that the image information and the location information are correlated with each other.

Next, the server 1120 will be described.

The first feature point extraction module 103 extracts feature points from the scenery image recorded in the location and image data storage means 1103, and outputs location information and feature amounts of the feature points with respect to the scenery image.

The scenery image database 104 is the same as that of the exemplary embodiment shown in FIG. 1. The scenery image database 104 is built once on the server, and after the database has been completely built, the scenery image database 104 is replicated and its replica is installed on a vehicle targeted for positioning.

The future variable area extraction module 105 extracts areas corresponding to vehicles, pedestrians and plants whose locations and/or shapes are likely to vary in future from among scenery images included in location and image data 803 to which the first feature point extraction module 103 has referred.

The scenery image database building module 106 stores particular feature points of those having been extracted by the first feature point extraction module 103, along with correlating the particular feature points with the location information having been acquired by the location information acquisition module 102. The particular feature points are feature points except for feature points corresponding to vehicles, pedestrians and plants, which have been extracted by the future variable area extraction module 105.

The positioning target mobile object mounted apparatus 110 is the same as that of the exemplary embodiment shown in FIG. 1.

Next, operation of this third exemplary embodiment will be described in detail with reference to the drawings. Since the operation of the positioning target mobile object mounted apparatus 110 is the same as that illustrated in the flowchart of FIG. 8, description thereof is omitted here. Here, two kinds of operation with respect to the database building mobile object mounted apparatus 1100 and the server 1120 will be described.

Figure 12:
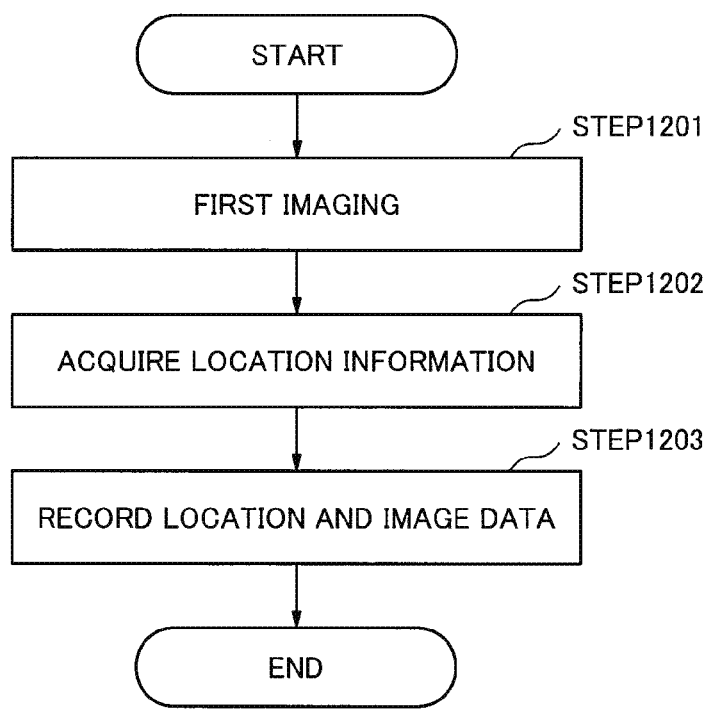
FIG. 12 is a flowchart for a database building mobile object mounted apparatus in a third exemplary embodiment of the present invention.

First, operation of the database building mobile object mounted apparatus 1100 will be described by using a flowchart shown in FIG. 12.

The first imaging module 101 images an image in front of a mobile object (Step S1201). The location information acquisition module 102 acquires accurate current location information related to the mobile object in synchronization with the operation performed in Step S1201 (Step S1202). The location and image data recording module 1102 stores the image and the location information, which have been acquired in Step S1201 and Step S1202, respectively, into the image data storage means 1103 such that the image and the location information are correlated with each other (Step S1203).

Figure 13:
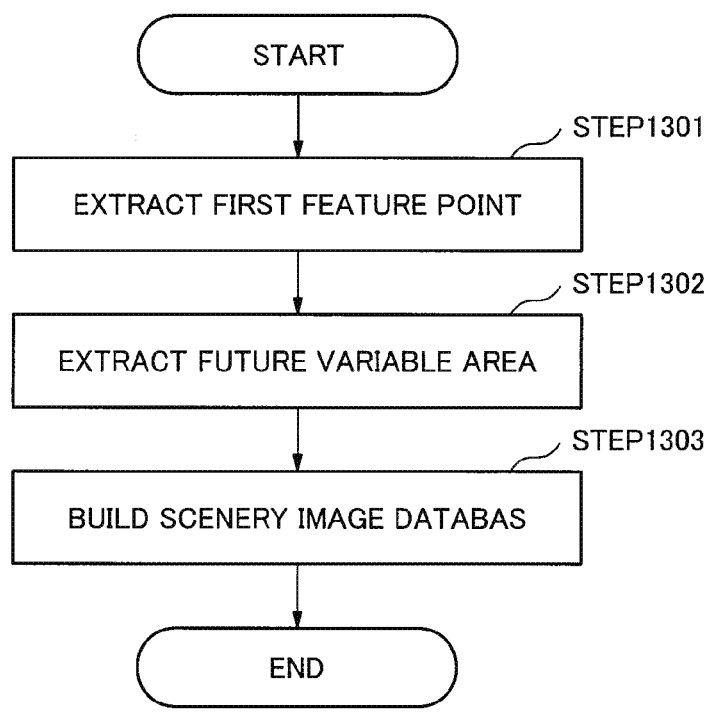
FIG. 13 is a flowchart for a server apparatus in a third exemplary embodiment of the present invention.

Next, operation of the server 1120 will be described with reference to a flowchart shown in FIG. 13.

First, the first feature point extraction module 101 extracts feature points from image data of the location and image data having been created by the database building mobile object mounted apparatus 1100, and extracts locations and feature amounts of the respective feature points on the image (Step S1301). Next, the future variable area extraction module 105 extracts areas corresponding to vehicles, pedestrians, plants and the like from image data the same as the image data having been referred to in Step S1301 (Step S1302).

Further, the scenery image database building module 106 removes feature points corresponding to the areas having been extracted in Step S1302 from the feature points having been extracted in Step S1301. A scenery image database is built by correlating information (locations on the image and feature amounts) regarding feature points remained after the removal with photograph location information, which is stored so as to be correlated with the image data having been referred to in Step S1301 (Step S1303).

Figure 20:
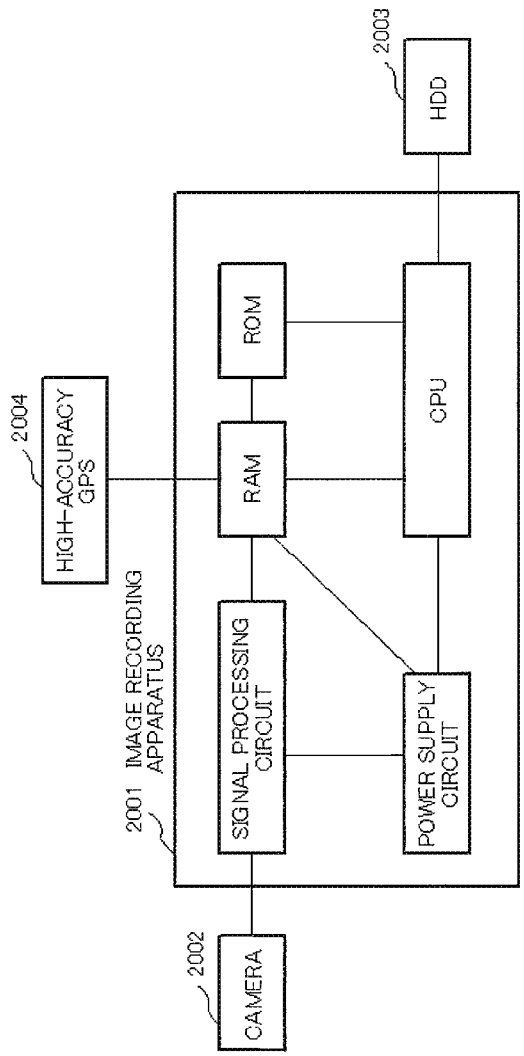
FIG. 20 is a diagram illustrating a hardware configuration of a database building mobile object mounted apparatus in a third exemplary embodiment of the present invention.

The above-described database building mobile object mounted apparatus 1100 is constituted by an image recording apparatus 2001, an in-vehicle camera 2002, a hard disk 2003 and a high-accuracy GPS 2004, such as shown in FIG. 20, and it can be said that the database building mobile object mounted apparatus 1100 is configured such that the above-described modules are mounted and actuated on an apparatus configured in this manner.

The image recording apparatus 2001 is a unit for controlling the entire apparatus, and includes a central processing unit (CPU), random access memory (RAM), read only memory (ROM), a signal processing circuit, a power supply circuit and the like. That is, the above-described exemplary embodiment is realized by reading computer programs, which can realize the functions and the determination logics of the flowchart having been referred to in the description therefor, into the ECU 2001 and executing the computer programs, except for the functions of the imaging module and the location information acquisition module. Further, it is also possible to realize the functions performed by the ECU 2001 by hardware and integrate them into a microcomputer. Moreover, a part of the functions may be realized by hardware components, and the same functions may be realized by cooperated operation of the hardware components and software programs.

Figure 21:
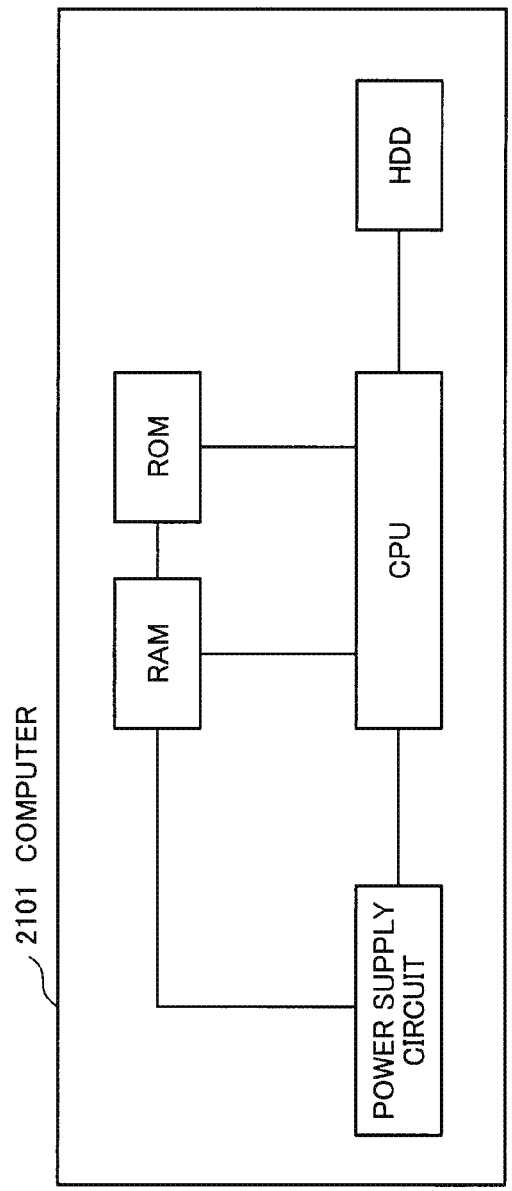
FIG. 21 is a diagram illustrating a hardware configuration of a server apparatus in a third exemplary embodiment of the present invention.

The above-described server apparatus 1120 is constituted by a computer 2101 shown in FIG. 21, and it can be said that the server apparatus 1120 is configured such that the above-described modules are installed and actuated on an apparatus configured in this manner. The computer 2101 includes, for example, a CPU, RAM, ROM, a signal processing circuit, a power supply circuit, a hard disk and the like. That is, the above-described exemplary embodiment is realized by reading computer programs, which can realize the functions and the determination logics of the flowchart having been referred to in the description therefor, into the computer 2101 and executing the computer programs. Further, it is also possible to realize the functions performed by the computer 2101 by hardware and integrate them into a microcomputer. Moreover, a part of the functions may be realized by hardware components, and the same functions may be realized by cooperated operation of the hardware components and software programs. The scenery image database having been built by the database building mobile object should exchange data with the database building mobile object via the hard disk included in the computer 2101.

Further, apparatuses installed in the positioning vehicle should be configured in the same manner as that shown in FIG. 19.

According to this exemplary embodiment, information related to images and locations, which are used for building a scenery image database, are accumulated once as location and image data, and then, the information is transported to the server apparatus 1120 and is processed there. Therefore, there is an advantageous effect in that, processing which is performed by the future variable area extraction module 105, and which has a relatively large amount of calculation, can be processed at higher speed by enhancing the calculation ability of the server apparatus 1120. In particular, when increasing the number of kinds of areas extracted by the future variable area extraction module 105, or the like, this exemplary embodiment, for which the calculation ability can be easily enhanced, is suitable.

Fourth Exemplary Embodiment

Figure 14:
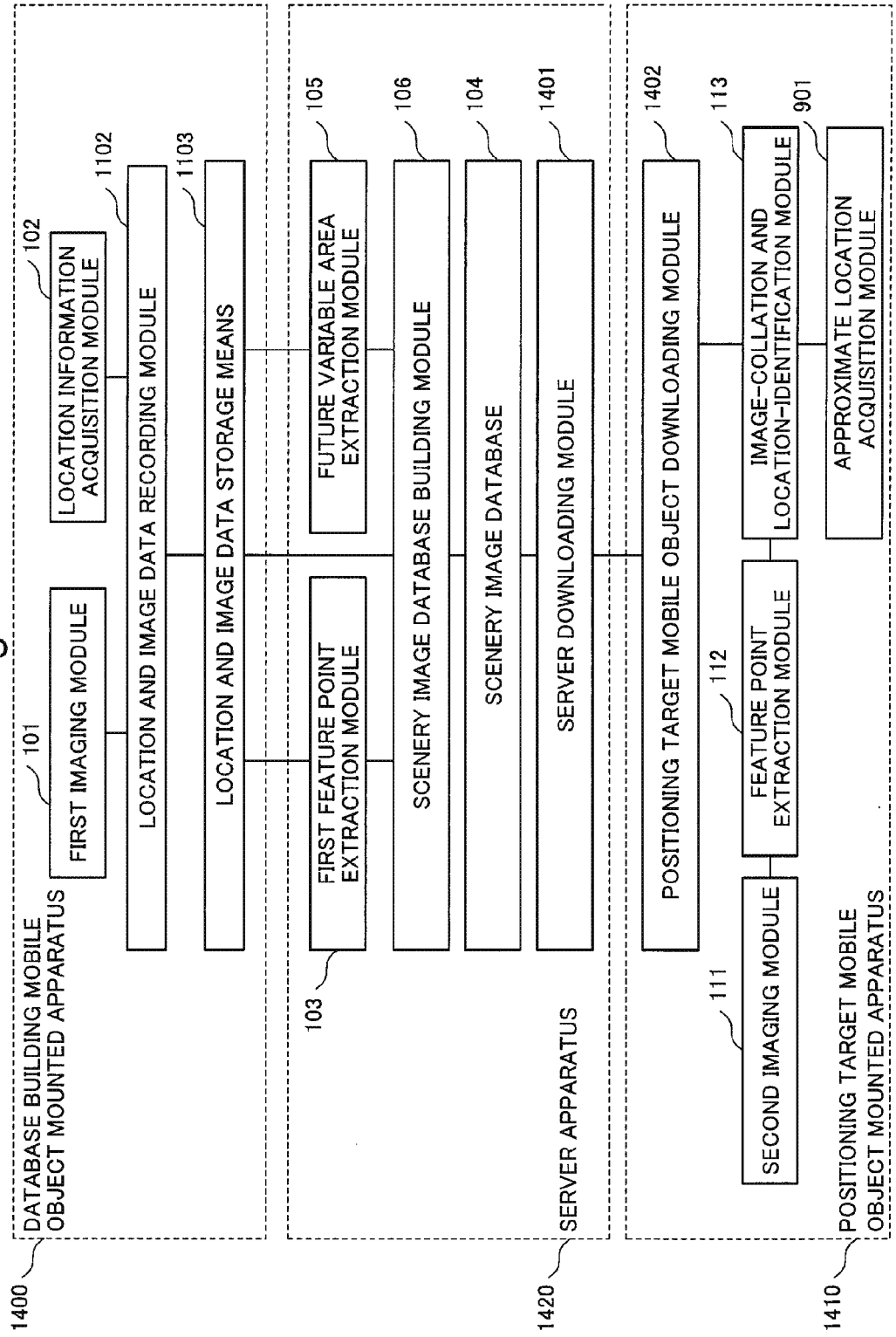
FIG. 14 is a diagram describing a fourth exemplary embodiment of the present invention.

A fourth exemplary embodiment of the present invention will be described by using FIG. 14. Referring to FIG. 14, this fourth exemplary embodiment further includes a server downloading module 1401 inside a server apparatus 1420, as compared with the configuration shown in FIG. 11. Moreover, a positioning target mobile object mounted apparatus 1410 includes an approximate location acquisition module 901 which acquires current approximate locations, and a positioning target mobile object downloading module 1402 which can acquire part of the scenery image database by communicating with the server apparatus 1420.

The functions of the database building mobile object mounted apparatus 1400 and the server 1420 are mostly the same as those of an example shown in FIG. 11, and are different in only the server downloading module 1401.

Upon reception of a request for downloading information related to an approximate location and data stored in the scenery image database from the positioning target mobile object downloading module 1402 of the positioning target mobile object mounted apparatus 1410, the server downloading module 1401 operates as follows. That is, the server downloading module 1401 extracts data related to records having been created at spots around the relevant approximate location from the scenery image database stored in the server, and transmits this data to the positioning target mobile object downloading module 1402.

Next, the function of the positioning target mobile object mounted apparatus 1410 will be described.

The functions of the second imaging module 111 and the second feature point extraction module 112 are the same as those of the exemplary embodiment shown in FIG. 11.

The positioning target mobile object downloading module 1402 transmits a request message for requesting information related to the approximate location and the scenery image data which have been acquired by the approximate location acquisition module 601 to the server downloading module 1401 of the server 1420. Subsequently, the positioning target mobile object downloading module 1402 receives the relevant scenery image data from the server downloading module 1401.

The image-collation and location-identification module 113 collates the feature point information having been extracted by the second feature point extraction module 112 with the scenery image data having been received from the server downloading module 1401, and thereby determines an accurate current location of the mobile object.

Next, operation of this exemplary embodiment will be described. The operation of the database building mobile object mounted apparatus is the same as that of the flowchart shown in FIG. 12.

Figure 15:
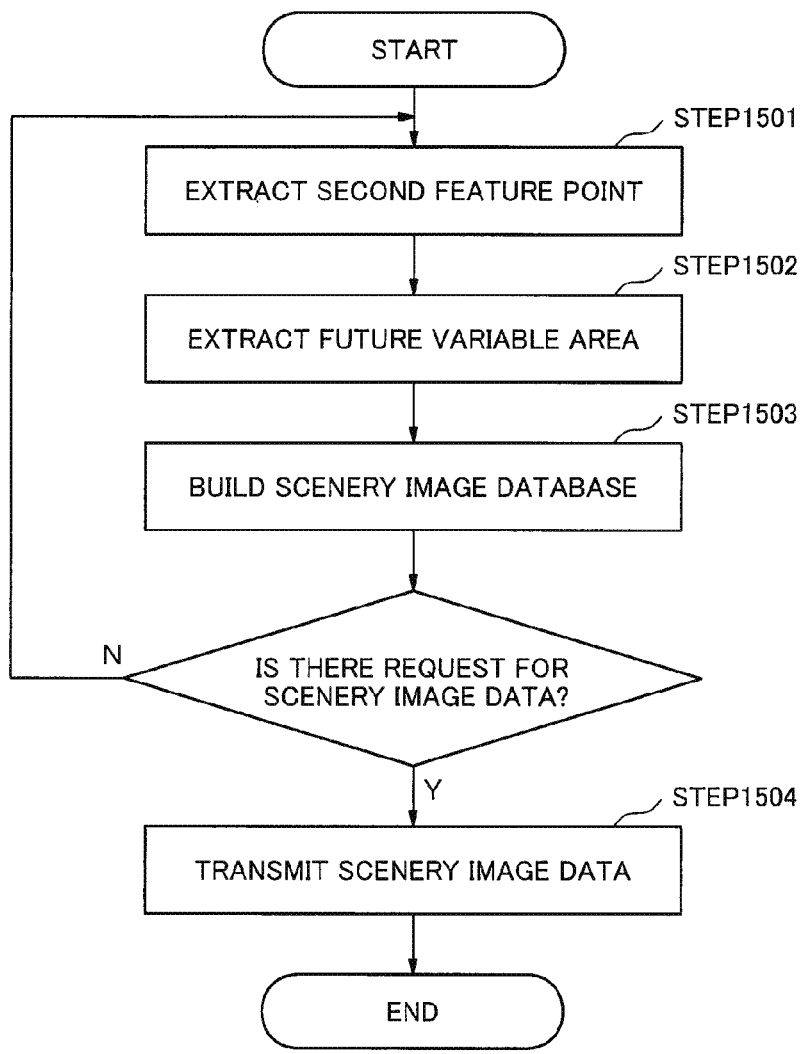
FIG. 15 is a flowchart for a server apparatus in a fourth exemplary embodiment of the present invention.

The operation of the server 1420 will be described referring to a flowchart shown in FIG. 15. Processes in Steps S1501 to S1503 are the same as those in Steps S1201 to S1203.

The server downloading module 1401 operates as described below only when having received a request for data of the scenery image database from the positioning target mobile object downloading module 1402 of the positioning target mobile object mounted apparatus 1410. That is, the server down load module 1401 extracts corresponding scenery image data and transmits the scenery image data (Step S1504).

Figure 16:
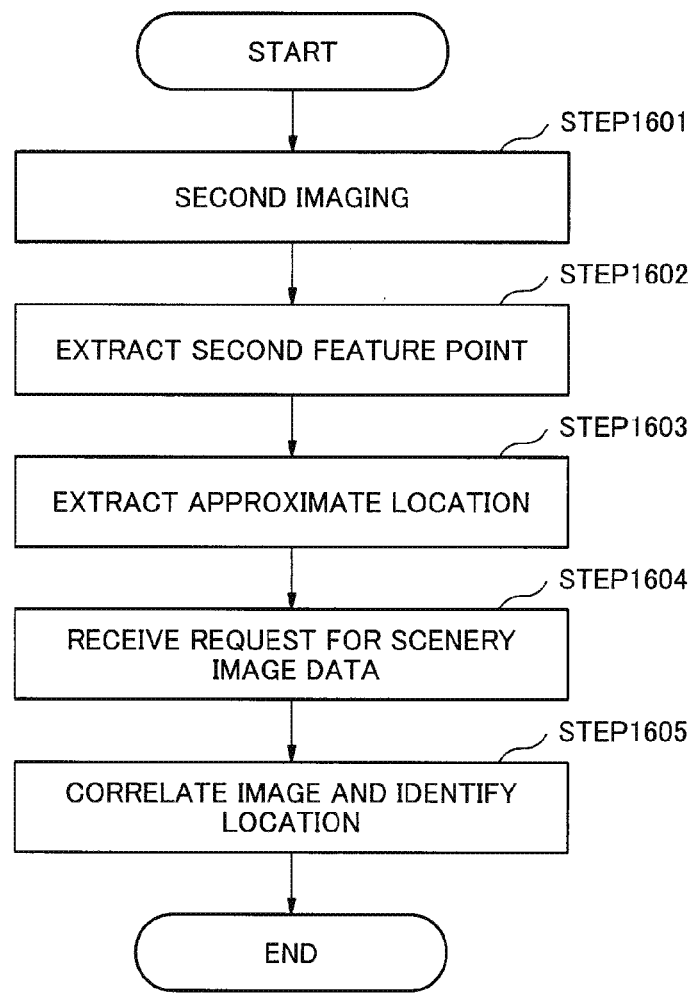
FIG. 16 is a flowchart for a positioning target mobile object mounted apparatus in a fourth exemplary embodiment of the present invention.

Next, the operation of the positioning target mobile object mounted apparatus 1410 will be described referring to a flowchart shown in FIG. 16.

First, the second imaging module 111 images a scenery image (Step S1601). The second feature point extraction module 112 outputs feature amounts of corresponding feature points from the image having been photographed in Step S1601 (Step S1602). The approximate location acquisition module 901 acquires an approximate location of the positioning target mobile object mounted apparatus 1410 (Step S1603).

The positioning target mobile object downloading module 1402 communicates with the server downloading module 1401 of the server 1420, and thereby receives scenery image data corresponding to the approximate location (Step S1604).

Finally, the image-collation and location-identification module 113 collates the scenery image data having been received by the positioning target mobile object downloading module 1402 with the feature amounts of the corresponding feature points having been extracted by the second feature point extraction module 112. Subsequently, the image-collation and location-identification module 113 determines a current location of the mobile object (Step S1605).

Figure 22:
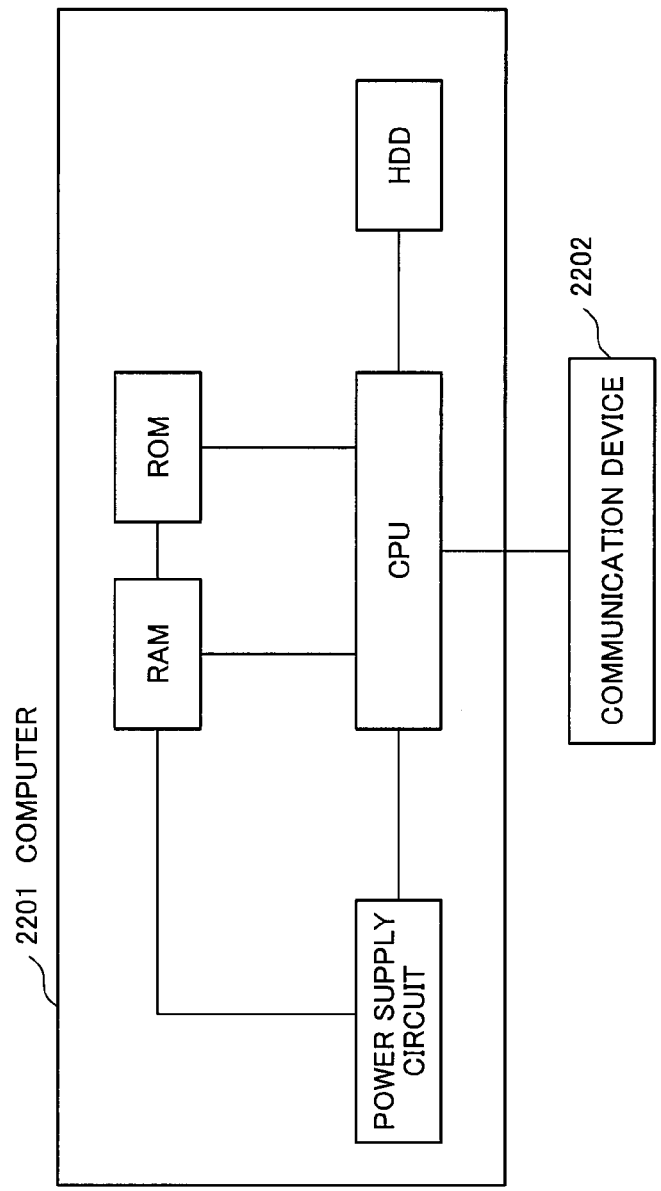
FIG. 22 is a diagram illustrating a hardware configuration of a server apparatus in a fourth exemplary embodiment of the present invention.

The above-described server apparatus 1420 has been described above as an apparatus which is constituted by a computer 2201 and a communication device 2202 such as shown in FIG. 22, and it can be said that the server apparatus 1420 is configured such that the above-described modules are installed and actuated on an apparatus configured in this manner. The computer 2202 includes, for example, a CPU, RAM, ROM, a signal processing circuit, a power supply circuit, a hard disk and the like. That is, the functions of the above-described exemplary embodiment are realized by reading computer programs, which can realize the functions and the determination logics of the flowchart having been referred to in the description therefor, into the computer 2201 and executing the computer programs, except for the function of the sever downloading module 1401. Further, it is also possible to realize the functions performed by the computer 2201 by hardware and integrate them into a microcomputer. Moreover, a part of the functions may be realized by hardware components, and the same functions may be realized by cooperated operation of the hardware components and software programs. The communication device 2202 is a hardware component for a wireless local area network (LAN) or mobile-phone data communication, which performs the function of the server downloading module 1401.

Figure 23:
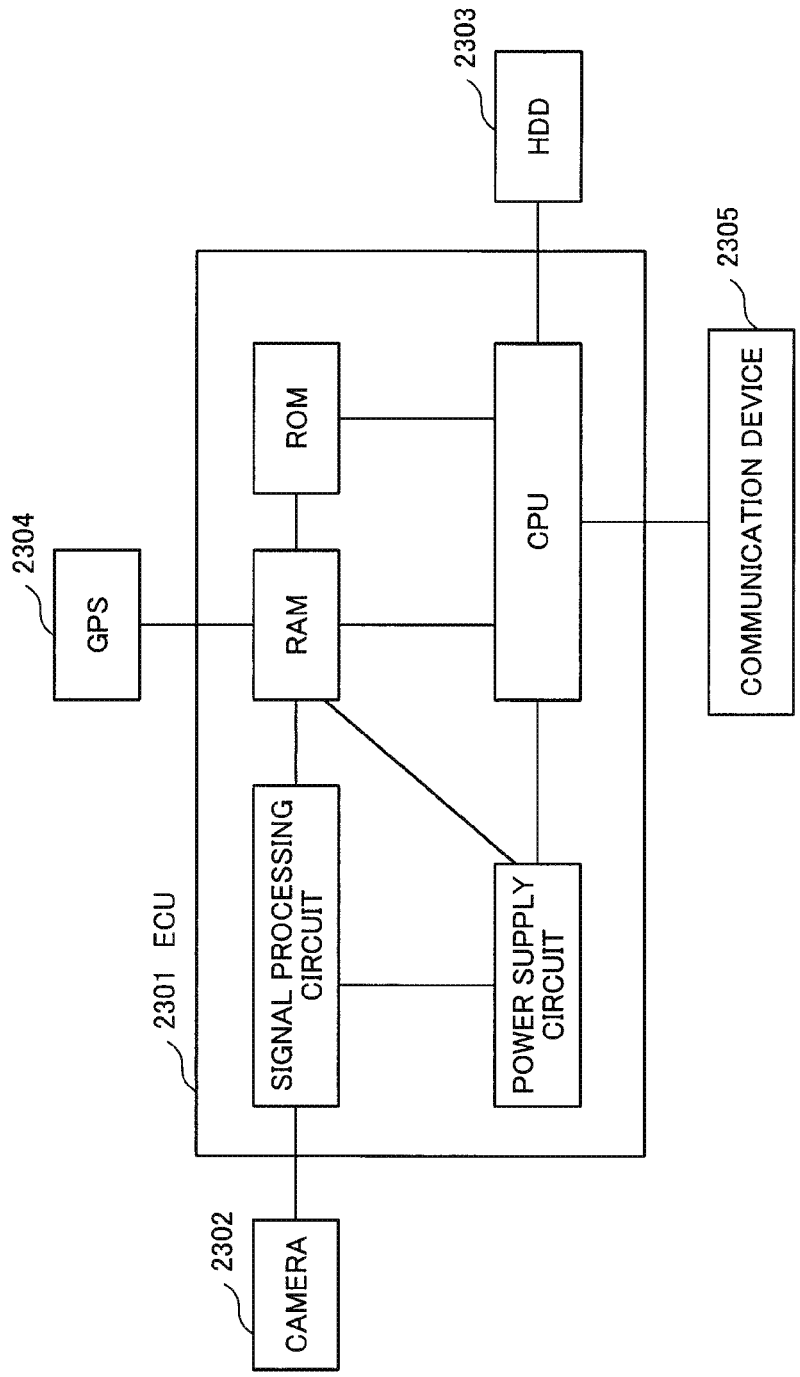
FIG. 23 is a diagram illustrating a hardware configuration of a positioning target mobile object mounted apparatus in a fourth exemplary embodiment of the present invention.

Further, the above-described positioning target mobile object mounted apparatus 1410 includes an electronic control unit (ECU) 2301, a camera 2302, a hard disk 2303, a GPS 2304 and a communication device 2305, such as shown in FIG. 23. Further, it can be said that the positioning target mobile object mounted apparatus 1410 is configured such that the above-described modules are installed and actuated on an apparatus configured in this way. The ECU 2301 is a unit for controlling the entire apparatus, and includes a CPU, RAM, ROM, a signal processing circuit, a power supply circuit and the like. That is, the above-described exemplary embodiment is realized by reading computer programs, which can realize the functions and the determination logics of the flowchart having been referred to in the description therefor, into the ECU 2301, and executing the computer programs. Further, it is also possible to realize the functions performed by the ECU 2301 by hardware and integrate them into a microcomputer. Moreover, part of the functions may be realized by hardware components, and the same functions may be realized by cooperated operation of the hardware components and software programs.

With respect to the scenery image database having been built in the database building mobile object, a replica thereof should be stored in the hard disk 2303. Further, as a different configuration example, the replica may be stored in ROM of the ECU 2301 without any use of the hard disk. The communication device 2305 is a hardware component for a wireless local area network (LAN) or mobile-phone data communication, which performs the function of the server downloading module 1401.

According to this exemplary embodiment, it is unnecessary to retain the scenery image database in the positioning target mobile object mounted apparatus 1410, and thus, it is possible to reduce the storage capacity of the magnetic disk to be installed in the positioning target mobile object mounted apparatus 1410. Moreover, the scenery image database is stored in the server 1420, and thus, there is an advantage in that it is easy to update the scenery image database. In the case where the scenery image database is retained in the positioning target mobile object mounted apparatus 1410, it is necessary to update the scenery image database retained in all the positioning target mobile object mounted apparatuses 1410.

Figure 17:
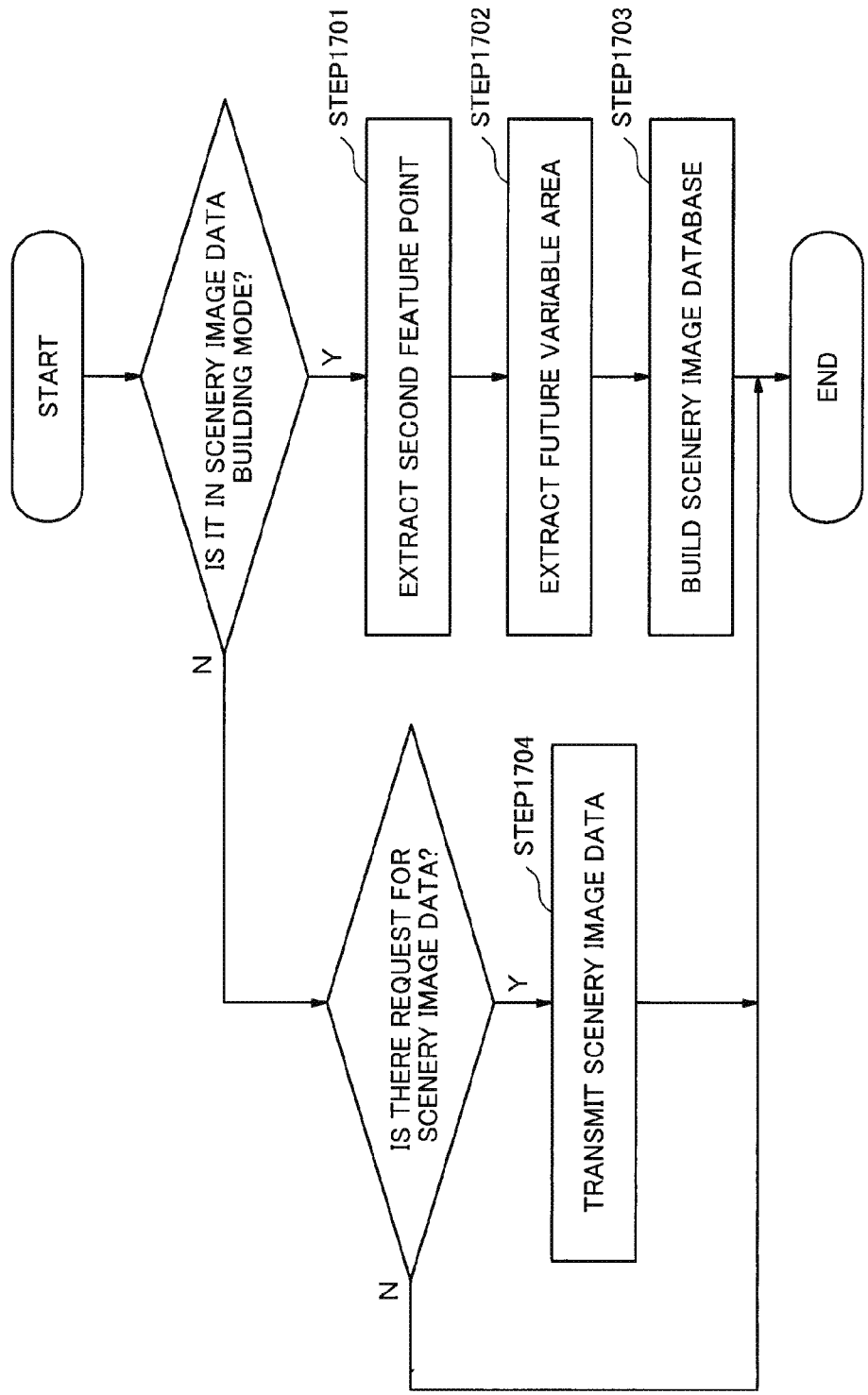
FIG. 17 is another flowchart for a server in a fourth exemplary embodiment of the present invention.

In addition, in the flowchart regarding the server apparatus 1420, the processes in Steps S1501 to S1504 have been described as an example of operations to be performed as a series of processes, but, the process of building the scenery image database and the process of transmitting the scenery image data are not performed simultaneously. That is, processing may be performed such that, as shown in FIG. 17, in accordance with a user's setting on operation modes, any one of a scenery image database building mode and a scenery image data transmitting mode is carried out.

Fifth Exemplary Embodiment

Next, a fifth exemplary embodiment for practicing the present invention will be described.

Figure 24:
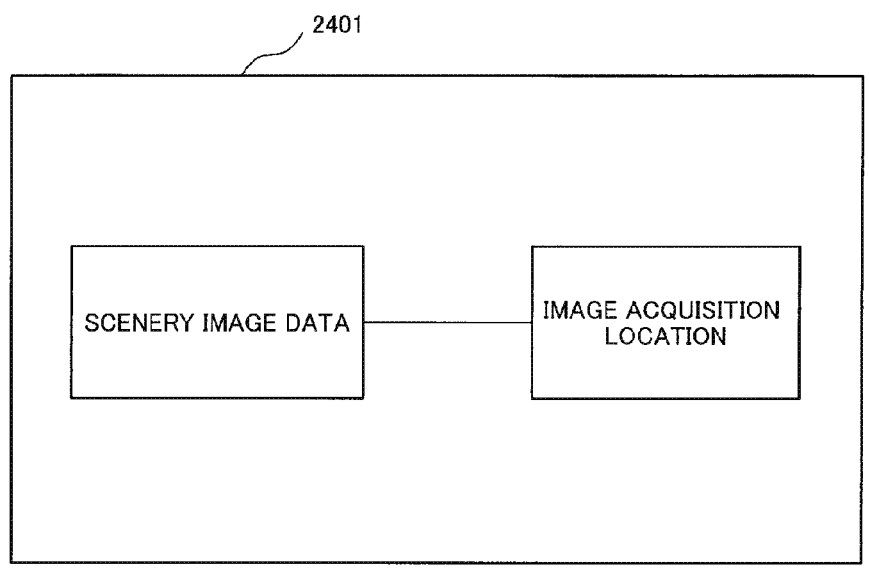
FIG. 24 is a diagram illustrating a hardware configuration of a database building mobile object mounted apparatus in a fifth exemplary embodiment of the present invention.

FIG. 24 is a diagram illustrating a scenery image database according to a fifth exemplary embodiment of the present invention.

In a scenery image database 2401 of this exemplary embodiment, a plurality of scenery image data and image acquisition locations at which the corresponding image data are stored such that the scenery image data and the image acquisition locations are correlated with each other.

Moreover, in the scenery image database 2401 of this exemplary embodiment, each of the scenery image data includes feature amounts of feature points corresponding to things other than things whose locations or shapes are unlikely to be kept as they are during a predetermined period of time on the real world.

In the fifth exemplary embodiment described above, the advantageous effects described below can be obtained. That is, it is possible to provide a scenery image database for use in a positioning system, which makes it possible to, in a positioning target mobile object, perform positioning processing with smaller amount of calculation by identifying feature points for each of which properly correlating is highly likely to be difficult to be performed, and not storing the identified feature points into the scenery image database.

In addition, in each of the exemplary embodiments having been described so far, a dedicated apparatus is supposed, but the following type of apparatus is sufficient. That is, for example, boards, cards or the like necessary for performing processes corresponding to the processes of the above-described exemplary embodiments are installed in a personal computer apparatus capable of performing various data processes, and the individual processes are performed under the control of the computer apparatus side. In this way, a configuration may be made such that software for executing the processes are installed into the personal computer apparatus, and are executed.

The software, which are installed into a data processing apparatus, such as the personal computer apparatus, may be distributed via various types of recording (storage) medium, such as an optical disk or a memory card, or may be distributed via a communication means, such as the Internet.

The aforementioned exemplary embodiments may be each combined with any ones of the other exemplary embodiments.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application claims priority based on Japanese Patent Application No. 2010-226844 filed on Oct. 6, 2010, the disclosure of which is hereby incorporated by reference in its entirety.

The whole or part of the exemplary embodiments disclosed above can be described as, but not limited to, the following supplementary notes.

(Supplementary Note 1)

A scenery image database characterized by comprising a plurality of scenery image data and image acquisition locations at which the plurality of the scenery image data have been acquired are correlated with each other and stored, wherein each of the plurality of the scenery image data include a feature amount of a feature point corresponding to a thing other than a thing of which a location or a shape is unlikely to be kept as it is on the real world during a period larger than or equal to a predetermined period.

(Supplementary Note 2)

The scenery image database according to Supplementary Note 1, characterized in that the thing of which a location or a shape is unlikely to be kept as it is on the real world during a period larger than or equal to a predetermined period is a vehicle.

(Supplementary Note 3)

The scenery image database according to Supplementary Note 1 or Supplementary Note 2, characterized in that the thing of which a location or a shape is unlikely to be kept as it is on the real world during a period larger than or equal to a predetermined period is a person.

(Supplementary Note 4)

A database building apparatus characterized by comprising;

the scenery image database according to either of Supplementary Note 1 to Supplementary Note 3, first imaging means which takes a scenery image, location information acquisition means which acquires current location information, first feature point extraction means which extracts feature amounts of corresponding feature points from the scenery image acquired by the first imaging means, future variable area extraction means which extracts an area corresponding to a thing of which a location or a shape is unlikely to be kept as it is on the real world during a period larger than or equal to a predetermined period from the scenery image acquired by the first imaging means, and scenery image database building means which stores a feature amount of a feature point extracted by the first imaging means except a feature point that is extracted from the area extracted by the future variable area extraction means into the scenery image database, and the feature amount and the current location information are correlated with each other.

(Supplementary Note 5)

The database building apparatuses according to Supplementary Note 4, characterized in that the first imaging means takes an image not only an image of a wavelength band included in a viewable light region but also an image of a wavelength band not included in the viewable light region, and the future variable area extraction means extracts an area corresponding to a plant from the image acquired by the first imaging means.

(Supplementary Note 6)

A positioning target apparatus characterized by comprising;

the scenery image database according to ether of Supplementary Notes 1 to Supplementary Note 3, second imaging means which takes an image a scenery image, second feature point extraction means which extracts feature amounts of corresponding feature points from the scenery image acquired by the second imaging means, and image-collation and location-identification means which collates the feature amounts of the corresponding feature points extracted by the second feature point extraction means and the scenery image database, and thereby identify a current location of the positioning target mobile object.

(Supplementary Note 7)

The positioning target apparatus according to Supplementary Note 6, characterized by further comprising approximate location acquisition means which acquires a current approximate location of the positioning target apparatus, wherein the image-collation and location-identification means performs image collation by using only scenery image data which is among the scenery image data stored in the scenery image database, and the scenery image data has been created at a location around the approximate location by the positioning target apparatus.

(Supplementary Note 8)

A positioning system characterized by comprising;

the database building apparatus according to either of Supplementary Note 1 to claim 3, and the position target apparatus according to Supplementary Note 6 or Supplementary Note 7, wherein the scenery image database of the positioning target apparatus has the same content as a content of the scenery image database which has been built by the database building apparatus.

(Supplementary Note 9)

The positioning system according to Supplementary Note 8, characterized by further comprising;

a server apparatus which includes scenery-image-database inside server-apparatus downloading means that transfers a scenery image data in the scenery image database, which the scenery image data is correlated with a location information around a location indicated by the location information upon reception of a request from the positioning target mobile object for transfer of location information and scenery image data, wherein the positioning target mobile object further includes approximate location acquisition means which acquires an approximate location of the positioning target mobile object, and scenery-image-database on positioning-target-mobile-object downloading means which acquires scenery image data in the scenery image database, and which is correlated with a location information around a location indicated by the approximate location information by transmitting the request for transfer of location information and scenery image data to the scenery-image-database inside server-apparatus downloading means, and wherein the image-collation and location-identification means collates the scenery database acquired by the scenery image database downloading means and the feature amounts of the corresponding feature points acquired by the second feature point acquisition means, and thereby identifies the current location.

(Supplementary Note 10)

A database building method characterized by comprising;

taking a scenery image, acquiring current location information, extracting feature amounts of corresponding feature points from the scenery image, and extracting an area which corresponds to an object of which a location or a shape is likely to vary in future in the real world from the scenery image.

(Supplementary Note 11)

The database building method according to Supplementary Note 10, characterized in that not only an image of a wavelength band included in a viewable light region but also an image of a wavelength band not included in the viewable light region is taken, and an area corresponding to a plant is extracted from the scenery image data.

(Supplementary Note 12)

A computer-readable storage medium for storing a scenery image database building program according to either of Supplementary Note 1 to Supplementary Note 3 which can be executed on a computer characterized by comprising the steps of;

a first imaging step of taking a scenery image, a location information acquisition step of acquiring current location information, a first feature point extraction step of extracting feature amounts of corresponding feature points from the scenery image acquired by the first imaging means, and a future variable area extraction step of extracting an area corresponding to an object of which a location or a shape is likely to vary in the real world from the scenery image data acquired by the first imaging means.

INDUSTRIAL APPLICABILITY

This invention relates to positioning system, scenery image database, database building equipment, database building method, scenery image database building program and position estimating object device which identify a current position of the mobile object based on landscape image which was photographed by image pickup means loaded into mobile object and has the availability on the industry.

REFERENCE SIGN LIST

100 Database building mobile object mounted apparatus
101 First imaging module
102 Location information acquisition module
103 First feature point extraction module
104 Scenery image database
105 Future variable area extraction module
106 Scenery image database building module
110 Positioning target mobile object mounted apparatus
111 Second imaging module
112 Second feature point extraction module
113 Image-collation and location-identification module
114 Scenery image database
201 Record number
202 Photograph location information
203 Latitude
204 Longitude
205 Feature point information
206 Feature point total number
207 Coordinate location
208 Image feature amount
301 Road surface area
302 Building area
303 Parking vehicle area
401 Feature point corresponding to parking vehicle area 303
402 Feature points remaining after the removal of feature points 401
501, 502, 503 and 504 Four spots at which data was collected
505 An angle which was estimated by an image-collation and location-identification module, and which is relative to an optic axis regarding a current location relative to a spot 502
506 An angle which was estimated by an image-collation and location-identification module, and which is relative to an optic axis regarding a current location relative to a spot 503
507 Current location of a positioning target mobile object
901 Approximate location acquisition module
910 Positioning target mobile object mounted apparatus
1102 Location and image data recording module
1103 Location and image data storage means
1120 Server apparatus
1401 Server downloading module
1402 Positioning target mobile object downloading module
1420 Server apparatus
1801 ECU
1802 and 2002 Camera
1803 and 2003 Hard disk
1804 and 2004 High-accuracy GPS
1901 and 2301 ECU
1902 and 2302 Camera
1903 and 2303 Hard disk
2001 Image recording apparatus
2101 and 2201 Computer
2202 Communication device
2304 GPS
2305 Communication device

What is claimed is:

1. A scenery image database, comprising:
a hard disk having a plurality of scenery image data corresponding to a plurality of acquired scenery images stored thereon, wherein each of the plurality of the scenery image data includes an extracted portion of a corresponding one of the plurality of acquired scenery images,
wherein the extracted portion includes one or more feature amounts of one or more extracted feature points corresponding to one or more things that are identified to remain in a stationary state during a predetermined period, and the extracted portion does not include non-extracted feature points corresponding to one or more things that are identified to not remain in the stationary state during a period larger than or equal to the predetermined period.

2. The scenery image database according to claim 1, wherein the one or more things that are identified to not remain in the stationary state comprises a vehicle.

3. The scenery image database according to claim 1, wherein the one or more things that are identified to not remain in the stationary state comprises a person.

4. A database building apparatus comprising:
the scenery image database according to claim 1,
a first imaging unit configured to acquire the plurality of acquired scenery images; and
a feature point extraction unit configured to extract the one or more extracted feature points from the plurality of acquired scenery images acquired by the first imaging unit.

5. The database building apparatus according to claim 4, wherein the first imaging unit is configured to acquire the plurality of acquired scenery images by capturing light having a wavelength band not included in the visible-light region.

6. A positioning target apparatus comprising:
the scenery image database according to claim 1;
an imaging unit configured to acquire a scenery image;
a feature point extraction unit configured to extract one or more feature amounts of corresponding feature points from the scenery image acquired by the imaging unit; and
an image-collation and location-identification unit configured to compare the extracted one or more feature amounts of the corresponding feature points extracted by the feature point extraction unit to the plurality of scenery image data stored in the scenery image database to identify a current location of a mobile object.

7. The positioning target apparatus according to claim 6, further comprising a location acquisition unit configured to acquire an approximate location of the positioning target apparatus,
wherein the image-collation and location-identification unit compares the extracted one or more feature amounts of the corresponding feature points extracted by the feature point extraction unit to a subset of the plurality of scenery image data, wherein the subset of the plurality of scenery image data corresponds to a subset of the plurality of acquired scenery images created at a location around the approximate location of the positioning target apparatus.

8. A database building method, comprising:
acquiring, with an imaging unit, a scenery image;
extracting, from the scenery image, with a feature point extraction unit, an extracted portion comprising feature amounts of feature points corresponding to one or more things in the scenery image that are identified to remain in a stationary state during a predetermined period, and not feature amounts of feature points corresponding to one or more things in the scenery image that are identified to not remain in the stationary state during a period larger than or equal to the predetermined period; and
storing the extracted portion in a scenery image database.

9. The database building method according to claim 8, wherein acquiring the scenery image comprises acquiring a wavelength band included in a visible-light region and a wavelength band not included in the visible-light region.

10. A non-transitory tangible machine-readable media encoding instructions which, when executed by a processor, cause the processor to perform acts comprising:
acquiring a scenery image;
extracting, from the scenery image, an extracted portion comprising feature amounts of feature points corresponding to one or more things in the scenery image that are identified to remain in a stationary state during a predetermined period, and not feature amounts of feature points corresponding to one or more things in the scenery image that are identified to not remain in the stationary state during a period larger than or equal to the predetermined period; and
storing the extracted portion in a scenery image database.

11. The scenery image database of claim 1, comprising image acquisition locations at which the plurality of the scenery image data are acquired, wherein the image acquisition locations are correlated with the plurality of scenery image data.

12. The scenery image database according to claim 1, wherein the one or more things that are identified to not remain in the stationary state comprises a plant.

13. The database building method according to claim 8, wherein the one or more things that are identified to not remain in the stationary state comprises a plant.

14. The database building method according to claim 8, comprising acquiring location information corresponding to the acquired scenery image.

15. The database building method according to claim 14, comprising correlating the acquired location information with the extracted portion of the scenery image in the scenery image database.

16. The database building method according to claim 8, wherein the one or more things that are identified to not remain in the stationary state comprises a person.

17. The database building method according to claim 8, wherein the one or more things that are identified to not remain in the stationary state comprises a vehicle.

18. The non-transitory tangible machine-readable media according to claim 10, encoding instructions which, when executed by a processor, cause the processor to perform acts further comprising acquiring location information corresponding to the acquired scenery image.

19. The non-transitory tangible machine-readable media according to claim 18, encoding instructions which, when executed by a processor, cause the processor to perform acts further comprising correlating the acquired location information with the extracted portion of the scenery image in the scenery image database.

20. The non-transitory tangible machine-readable media according to claim 10, wherein the one or more things that are identified to not remain in the stationary state comprises a person.

* * * * *